United States Patent
Du et al.

(10) Patent No.: US 11,989,325 B1
(45) Date of Patent: *May 21, 2024

(54) PROTECTING MEMBERSHIP IN A SECURE MULTI-PARTY COMPUTATION AND/OR COMMUNICATION

(71) Applicant: Lemon Inc., Grand Cayman (KY)

(72) Inventors: Jian Du, Culver City, CA (US); Yongjun Zhao, Beijing (CN); Haohao Qian, Beijing (CN); Bo Jiang, Culver City, CA (US); Qiang Yan, Beijing (CN)

(73) Assignee: Lemon Inc., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 18/492,340

(22) Filed: Oct. 23, 2023

Related U.S. Application Data

(63) Continuation of application No. 18/297,530, filed on Apr. 7, 2023, now Pat. No. 11,829,512.

(51) Int. Cl.
*G06F 21/00* (2013.01)
*G06F 16/2455* (2019.01)
*G06F 16/25* (2019.01)
*G06F 21/62* (2013.01)

(52) U.S. Cl.
CPC .... *G06F 21/6245* (2013.01); *G06F 16/24558* (2019.01); *G06F 16/258* (2019.01)

(58) Field of Classification Search
None
See application file for complete search history.

(56) References Cited

U.S. PATENT DOCUMENTS

| | | | |
|---|---|---|---|
| 7,058,603 B1 ‡ | 6/2006 | Rhiando | |
| 9,652,622 B2 ‡ | 5/2017 | Garfinkle et al. | |
| 10,289,816 B1 ‡ | 5/2019 | Malassenet et al. | |
| 11,522,688 B2 ‡ | 12/2022 | Goodsitt et al. | |
| 11,593,510 B1 ‡ | 2/2023 | Knox et al. | |

(Continued)

FOREIGN PATENT DOCUMENTS

| CN | 116049626 A | * | 5/2023 |
|---|---|---|---|
| CN | 116049626 A | | 5/2023 |

OTHER PUBLICATIONS

Mohassel et al., " How to Hide Circuits in MPC: An Efficient Framework for Private Function Evaluation", Cryptology ePrint Archive, received Mar. 9, 2013, https://eprint.iacr.org/2013/137.‡

(Continued)

*Primary Examiner* — Shin-Hon (Eric) Chen
(74) *Attorney, Agent, or Firm* — HSML P.C.

(57) ABSTRACT

Protecting membership in secure multi-party computation and communication is provided. A method of protecting membership includes generating a padding dataset, up-sampling a first dataset with the padding dataset, transforming and dispatching the first dataset, receiving a second dataset, and performing a private set intersection operation based on the first dataset and the second dataset to generate a third dataset. Each of the first dataset, the padding dataset, and/or the second dataset includes one or more personal identification information for each user or member in the dataset.

20 Claims, 12 Drawing Sheets

(56) References Cited

U.S. PATENT DOCUMENTS

| | | | |
|---|---|---|---|
| 11,704,431 B2* | 7/2023 | Kraus | H04L 63/0414 726/26 |
| 2004/0179686 A1‡ | 9/2004 | Matsumura et al. | |
| 2010/0131764 A1* | 5/2010 | Goh | H04L 9/321 713/171 |
| 2011/0202764 A1‡ | 8/2011 | Furukawa | |
| 2012/0143922 A1‡ | 6/2012 | Rane et al. | |
| 2013/0212690 A1‡ | 8/2013 | Fawaz et al. | |
| 2016/0150047 A1‡ | 5/2016 | O'Hare et al. | |
| 2018/0101697 A1‡ | 4/2018 | Rane et al. | |
| 2019/0065775 A1‡ | 2/2019 | Klucar, Jr. et al. | |
| 2019/0244138 A1‡ | 8/2019 | Bhowmick et al. | |
| 2019/0361794 A1* | 11/2019 | Maksyutov | G06F 11/3495 |
| 2020/0250335 A1‡ | 8/2020 | Hockenbrocht et al. | |
| 2020/0401726 A1‡ | 12/2020 | Lim et al. | |
| 2021/0073677 A1‡ | 3/2021 | Peterson et al. | |
| 2021/0173856 A1‡ | 6/2021 | Chitnis et al. | |
| 2021/0336771 A1‡ | 10/2021 | Mukherjee | |
| 2021/0360010 A1‡ | 11/2021 | Zaccak et al. | |
| 2021/0399874 A1‡ | 12/2021 | Polyakov et al. | |
| 2022/0100899 A1‡ | 3/2022 | Saillet et al. | |
| 2022/0138348 A1‡ | 5/2022 | Bernau et al. | |
| 2022/0244988 A1* | 8/2022 | Zhang | G06F 9/4881 |
| 2022/0277097 A1* | 9/2022 | Cabot | H04W 12/02 |
| 2022/0335450 A1* | 10/2022 | Fenton | G06Q 30/0202 |
| 2022/0405800 A1‡ | 12/2022 | Walcott et al. | |
| 2023/0017374 A1‡ | 1/2023 | Boehler | |
| 2023/0045553 A1* | 2/2023 | Deshpande | G06F 21/6245 |
| 2023/0125887 A1‡ | 4/2023 | Habite et al. | |
| 2023/0146259 A1‡ | 5/2023 | Liktor et al. | |
| 2023/0214684 A1* | 7/2023 | Wang | G06F 21/6245 713/189 |

OTHER PUBLICATIONS

Garimella et al., "Private Set Operations from Oblivious Switching", Cryptology ePrint Archive, received Mar. 2, 2021, https://eprint.iacr.org/2021/243.‡

Chase et al., "Secret Shared Shuffle", Cryptology ePrint Archive, received Nov. 22, 2019, https://eprint.iacr.org/2019/1340.‡

Dwork et al., "Differential Privacy Under Continual Observation", Association for Computing Machinery, Jun. 5, 2010, pp. 715-724, https://dl.acm.org/doi/10.1145/1806689.1806787.‡

Dwork et al. "Our Data, Ourselves: Privacy via Distributed Noise Generation", Advances in Cryptology-EUROCRYPT 2006: 24th Annual International Conference on the Theory and Applications of Cryptographic Techniques, St. Petersburg, Russia, May 28-Jun. 1, 2006. Proceedings 25. Springer Berlin Heidelberg, 2006, https://doi.org/10.1007/11761679_29.‡

Dwork et al., "Differential Privacy and Robust Statistics", Association for Computing Machinery, May 31, 2009, pp. 371-380, https://dl.acm.org/doi/10.1145/1536414.1536466.‡

Ion et al., "On Deploying Secure Computing: Private Intersection-Sum-with-Cardinality", 2020 IEEE European Symposium on Security and Privacy (EuroS&P), Date of Conference: Sep. 7-11, 2020, Date added to IEEE Xplore: Nov. 2, 2020, https://www.researchgate.net/publication/346584438_On_Deploying_Secure_Computing_Private_Intersection-Sum-with-Cardinality.‡

Pinkas et al., "SpOT-Light: Lightweight Private Set Intersection from Sparse OT Extension", Cryptology ePrint Archive, received Jun. 3, 2019, https://eprint.iacr.org/2019/634.‡

Chandran et al., "Circuit-PSI with Linear Complexity via Relaxed Batch OPPRF", Cryptology ePrint Archive, received Jan. 12, 2021, https://eprint.iacr.org/2021/034.‡

Guo et al., "Birds of a Feather Flock Together: How Set Bias Helps to Deanonymize You via Revealed Intersection Sizes", 31st USENIX Security Symposium, Aug. 10-12, 2022, Boston, MA, USA, https://www.usenix.org/conference/usenixsecurity22/presentation/guo.‡

Buddhavarapu et al., "Private matching for compute", Cryptology ePrint Archive, 2020, https://eprint.iacr.org/2020/599.‡

Kairouz, Peter, Sewoong Oh, and Pramod Viswanath. "The composition theorem for differential privacy." International conference on machine learning. PMLR, 2015. (Year: 2015).‡

Office Action issued in U.S. Appl. No. 18/297,424, filed Jun. 20, 2023 (12 pages).‡

Office Action issued in U.S. Appl. No. 18/297,405, filed Jun. 14, 2023 (17 pages).‡

Notice of Allowance issued in U.S. Appl. No. 18/297,389, filed Aug. 7, 2023 (7 pages).‡

Notice of Allowance issued in U.S. Appl. No. 18/297,405, filed Aug. 30, 2023 (9 pages).‡

Notice of Allowance issued in U.S. Appl. No. 18/297,376, filed Aug. 30, 2023 (8 pages).‡

Notice of Allowance issued in U.S. Appl. No. 18/297,424, filed Aug. 2, 2023 (11 pages).‡

Case, Benjamin et al. "The Privacy-preserving Padding Problem: Non-negative Mechanisms for Conservative Answers with Differential Privacy." 20 pages. Oct. 15, 2021. https://arxiv.org/abs/2110.08177.‡

Office Action issued in U.S. Appl. No. 28/297,339, filed Aug. 3, 2023 (30 pages).‡

Office Action issued in U.S. Appl. No. 18/297,389, filed Jul. 11, 2023 (11 pages).‡

Office Action issued in U.S. Appl. No. 18/297,376, filed Jun. 12, 2023 (15 pages).‡

Office Action issued in U.S. Appl. No. 18/297,447, filed Jul. 12, 2023 (14 pages).‡

Notice of Allowance issued in U.S. Appl. No. 18/297,545, filed Aug. 2, 2023 (15 pages).‡

Du et al., DP-PSI: Private and secure set intersection, Aug. 28, 2022, Cornel University, https://doi.org/10.48550/arXiv.2208.13249V1, p. 1-9. (Year: 2022).‡

\* cited by examiner
‡ imported from a related application

PROTECTING MEMBERSHIP IN A SECURE MULTI-PARTY COMPUTATION AND/OR COMMUNICATION

FIELD

The embodiments described herein pertain generally to protecting membership privacy. More specifically, the embodiments described herein pertain to protecting membership (of an element, a member, a user, etc.) privacy in a secure multi-party computation and/or communication.

BACKGROUND

Private set intersection (PSI) is one of secure two- or multi-party protocols or algorithms by which intersection-related statistics are computed, and PSI has garnered significant industry interest. PSI algorithms or protocols permit two or more organizations to jointly compute a function (e.g., count, sum, etc.) over the intersection of their respective data sets without revealing to other party the intersection explicitly. In an application, two parties may be unwilling or unable to reveal the underlying data to each other, but they may still want to compute an aggregate population-level measurement. The two parties may want to do so while ensuring that the input data sets reveal nothing beyond these aggregate values about individual users.

SUMMARY

Features in the embodiments disclosed herein may provide a PSI algorithm or protocol to keep the users in the datasets anonymous during the PSI operations based on e.g., a differential privacy (DP) protocol or algorithm. Features in the embodiments disclosed herein may help to prevent potential membership leakage or exposure during the PSI operations, by e.g., integrating a protocol or algorithm with the DP protocol or algorithm for datasets or intersection of datasets having one or more Personal Identification Information (PII) for each user or member in the records or rows of the datasets or intersection of datasets.

Features in the embodiments disclosed herein may generate padding or filling elements for each party's dataset independently following a pre-calibrated distribution of noise, add the padding elements to each dataset, and execute a PSI algorithm or protocol. Further features in the embodiments disclosed herein may lead to the intersection size revealed in the subsequent PSI operations being random and differentially private, making it almost impossible for an attacker to determine a user's membership to a dataset or organization, in compliance with privacy regulation requirements.

In one example embodiment, a method for protecting membership in secure multi-party computation and communication is provided. The method includes providing a first dataset having a first identification field and a second identification field, and generating a padding dataset. A size of the padding dataset is determined based on a data privacy configuration. The method also includes up-sampling the first dataset with the padding dataset, transforming and dispatching the first dataset, receiving a second dataset having a third identification field and a fourth identification field, and performing an intersection operation based on the first dataset and the second dataset to generate a third dataset by: for each identification in the first identification field that matches an identification in the third identification field, removing a row having the matched identification from the second dataset and adding the removed row to the third dataset, and for each identification in the second identification field that matches an identification in the fourth identification field, removing a row having the matched identification from the second dataset and adding the removed row to the third dataset.

In another example embodiment, a secure multi-party computation and communication system is provided. The system includes a memory to store a first dataset and a processor to provide the first dataset having a first identification field and a second identification field and to generate a padding dataset. A size of the padding dataset is determined based on a data privacy configuration. The processor is further to up-sample the first dataset with the padding dataset, transform and dispatch the first dataset, receive a second dataset having a third identification field and a fourth identification field, and perform an intersection operation based on the first dataset and the second dataset to generate a third dataset by: for each identification in the first identification field that matches an identification in the third identification field, remove a row having the matched identification from the second dataset and add the removed row to the third dataset, and for each identification in the second identification field that matches an identification in the fourth identification field, remove a row having the matched identification from the second dataset and add the removed row to the third dataset.

In yet another example embodiment, a non-transitory computer-readable medium having computer-executable instructions stored thereon is provided. The instructions, upon execution, cause one or more processors to perform operations including providing a first dataset having a first identification field and a second identification field, and generating a padding dataset. A size of the padding dataset is determined based on a data privacy configuration. The operations also include up-sampling the first dataset with the padding dataset, transforming and dispatching the first dataset, receiving a second dataset having a third identification field and a fourth identification field, and performing an intersection operation based on the first dataset and the second dataset to generate a third dataset by: for each identification in the first identification field that matches an identification in the third identification field, removing a row having the matched identification from the second dataset and adding the removed row to the third dataset, and for each identification in the second identification field that matches an identification in the fourth identification field, removing a row having the matched identification from the second dataset and adding the removed row to the third dataset.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Non-limiting and non-exhaustive descriptions are described with reference to the following drawings. The components in the figures are not necessarily to scale, emphasis instead being placed upon illustrating principles. In the detailed descrip

DETAILED DESCRIPTION

Figure 1:
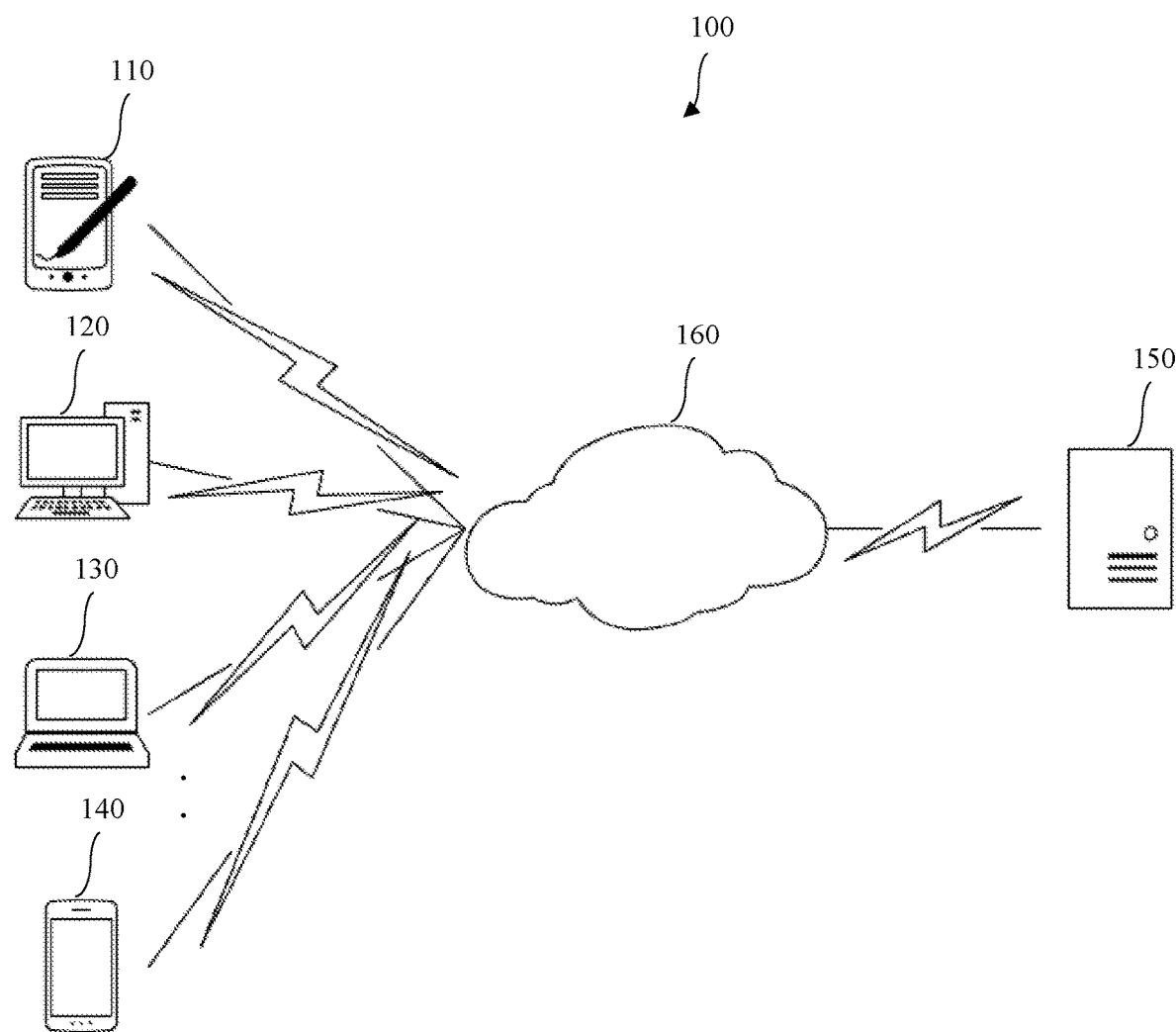
- FIG. 1 is a schematic view of an example secure computation and communication system, arranged in accordance with at least some embodiments described herein.

In the following detailed description, particular embodiments of the present disclosure are described herein with reference to the accompanying drawings, which form a part of the description. In this description, as well as in the drawings, like-referenced numbers represent elements that may perform the same, similar, or equivalent functions, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not intended to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

It is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure.

Additionally, the present disclosure may be described herein in terms of functional block components and various processing steps. It should be appreciated that such functional blocks may be realized by any number of hardware and/or software components configured to perform the specified functions.

The scope of the disclosure should be determined by the appended claims and their legal equivalents, rather than by the examples given herein. For example, the steps recited in any method claims may be executed in any order and are not limited to the order presented in the claims. Moreover, no element is essential to the practice of the disclosure unless specifically described herein as "critical" or "essential".

As referenced herein, a "data set" or "dataset" is a term of art and may refer to an organized collection of data stored and accessed electronically. In an example embodiment, a dataset may refer to a database, a data table, a portion of a database or data table, etc. It is to be understood that a dataset may correspond to one or more database tables, of which every column of a database table represents a particular variable or field, and each row of the database table corresponds to a given record of the dataset. The dataset may list values for each of the variables, and/or for each record of the dataset. It is also to be understood that a dataset may also or alternatively refer to a set of related data and the way the related data is organized. In an example embodiment, each record of a dataset may include field(s) or element(s) such as one or more predefined or predetermined identifications (e.g., membership identifications, user identifications, etc., such as user's name, e-mail address, phone numbers, user's unique ID, etc.), and/or one or more attributes or features or values associated with the one or more identifications. It is to be understood that any user's identification(s) and/or user's data described in this document are allowed, permitted, and/or otherwise authorized by the user for use in the embodiments described herein and in their proper legal equivalents as understood by those of skill in the art.

As referenced herein, "inner join" or "inner-join" is a term of art and may refer to an operation or function that includes combining records from datasets, particularly when there are matching values in a field common to the datasets. For example, an inner join may be performed with a "Departments" dataset and an "Employees" dataset to determine all the employees in each department. It is to be understood that in the resulting dataset (i.e., the "intersection") of the inner join operation, the inner join may contain the information from both datasets that is related to each other. An outer join, on the other hand, may also contain information that is not related to the other dataset in its resulting dataset. A private inner join may refer to an inner join operation of datasets of two or more parties that does not reveal the data in the intersection of datasets of the two or more parties.

As referenced herein, "hashing" may refer to an operation or function that transforms or converts an input (a key such as a numerical value, a string of characters, etc.) into an output (e.g., another numerical value, another string of characters, etc.). It is to be understood that hashing is a term of art and may be used in cyber security application(s) to access data in a small and nearly constant time per retrieval.

As referenced herein, "MPC" or "multi-party computation" is a term of art and may refer to a field of cryptography with the goal of creating schemes for parties to jointly compute a function over the joint input of the parties while keeping respective input private. It is to be understood that, unlike traditional cryptographic tasks where cryptography may assure security and integrity of communication or storage when an adversary is outside the system of participants (e.g., an eavesdropper on the sender and/or the receiver), the cryptography in MPC may protect participants' privacy relative to each other.

As referenced herein, "ECC" or "elliptic-curve cryptography" is a term of art and may refer to a public-key cryptography based on the algebraic structure of elliptic curves over finite fields. It is to be understood that the ECC may allow smaller keys compared to non-EC cryptography to provide equivalent security. It is also to be understood that "EC" or "elliptic curve" may be applicable for key agreement, digital signatures, pseudo-random generators, and/or other tasks. Elliptic curves may be indirectly used for encryption by combining a key agreement between/among the parties with a symmetric encryption scheme. Elliptic curves may also be used in integer factorization algorithms based on elliptic curves that have applications in cryptography.

As referenced herein, "decisional Diffie-Hellman assumption" or "DDH assumption" is a term of art and may refer to a computational complexity assumption about a certain problem involving discrete logarithms in cyclic groups. It is to be understood that the DDH assumption may be used as a basis to prove the security of many cryptographic protocols.

As referenced herein, "elliptic-curve Diffie-Hellman" or "ECDH" is a term of art and may refer to a key agreement protocol or a corresponding algorithm that allows two or more parties, each having an elliptic-curve public-private key pair, to establish a shared secret over an unsecured channel. It is to be understood that the shared secret may be directly used as a key or to derive another key. It is also to be understood that the key, or the derived key, may then be used to encrypt or encode subsequent communications using a symmetric-key cipher. It is further to be understood that ECDH may refer to a variant of the Diffie-Hellman protocol using elliptic-curve cryptography.

As referenced herein, "private set intersection" is a term of art and may refer to a secure multi-party computation cryptographic operation, algorithm, or function by which two or more parties holding respective datasets compare encrypted versions of these datasets in order to compute the intersection. It is to be understood that for private set intersection, neither party reveals data elements to the counterparty except for the elements in the intersection.

As referenced herein, "shuffle", "shuffling", "permute", or "permuting" is a term of art and may refer to an action or algorithm for rearranging and/or randomly rearranging the order of the records (elements, rows, etc.) of e.g., an array, a dataset, a database, a data table, etc.

As referenced herein, "differential privacy" or "DP" is a term of art and may refer to a standard, a protocol, a system, and/or an algorithm for publicly sharing information regarding a dataset by describing patterns of groups of elements within the dataset while withholding information about individual users listed in the dataset. It is to be understood that differential privacy may refer to a constraint on algorithms used to release aggregate information about a statistical dataset or database to a user, which limits the disclosure of private information of records for individuals whose information is in the dataset or database.

The following is a non-limiting example of the context, setting, or application of differential privacy. A trusted data owner (or data holder or curator, such as a social media platform, a website, a service provider, an application, etc.) may have stored a dataset of sensitive information about users or members (e.g., the dataset includes records/rows of users or members). Each time the dataset is queried (or operated, e.g. analyzed, processed, used, stored, shared, accessed, etc.), there may be a chance or possibility of an individual's privacy being compromised (e.g., probability of data privacy leakage or privacy loss). Differential privacy may provide a rigorous framework and security definition for algorithms that operate on sensitive data and publish aggregate statistics to prevent an individual's privacy from being compromised by, e.g., resisting linkage attacks and auxiliary information, and/or supplying a limit on a quantifiable measure of harm (privacy leakage, privacy loss, etc.) incurred by individual record(s) of the dataset.

It is to be understood that the above requirement of the differential privacy protocol or algorithm may refer to a measure of "how much data privacy is afforded (e.g., by a single query or operation on the input dataset) when performing the operations or functions?" A DP parameter "$\epsilon$" may refer to a privacy budget (i.e., a limit of how much data privacy it is acceptable with leaking), e.g., indicating a maximum difference between a query or operation on dataset A and the same query or operation on dataset A' (that differs from A by one element or record). The smaller the value of E is, the stronger the privacy protection is for the multi-identification privacy-protection mechanism. Another DP parameter "$\delta$" may refer to a probability, such as a probability of information being accidentally leaked. In an example embodiment, a required or predetermined numeric value of $\epsilon$ may range from at or about 1 to at or about 3. The required or predetermined numeric value of $\delta$ may range from at or about $10^{-10}$ (or at about $10^{-8}$) to at or about $10^{-6}$. Yet another DP parameter sensitivity may refer to a quantified amount for how much noise perturbation may be required in the DP protocol or algorithm. It is to be understood that to determine the sensitivity, a maximum of possible change in the result may need to be determined. That is, sensitivity may refer to an impact a change in the underlying dataset may have on the result of the query to the dataset.

As referenced herein, "differential privacy composition" or "DP composition" is a term of art and may refer to the total or overall differential privacy when querying (or operating, e.g., analyzing, processing, using, storing, sharing, accessing, etc.) a particular dataset more than once. DP composition is to quantify the overall differential privacy (which may be degraded in view of the DP of a single query or operation) when multiple separate queries or operations are performed on a single dataset. It is to be understood that when a single query or operation to the dataset has a privacy loss L, the cumulative impact of N queries (referred to as N-fold composition or N-fold DP composition) on data privacy may be greater than L but may be lower than L*N. In an example embodiment, an N-fold DP composition may be determined based on an N-fold convolution operation of the privacy loss distribution. For example, a DP composition of two queries may be determined based on a convolution of the privacy loss distribution of the two queries. In an example embodiment, the number N may be at or about 10, at or about 25, or any other suitable number. In an example embodiment, $\epsilon$, $\delta$, sensitivity, and/or the number N may be predetermined to achieve a desired or predetermined data privacy protection goal or performance.

FIG. 1 is a schematic view of an example secure computation and communication system 100, arranged in accordance with at least some embodiments described herein.

The system 100 may include terminal devices 110, 120, 130, and 140, a network 160, and a server 150. It is to be understood that FIG. 1 only shows illustrative numbers of the terminal devices, the network, and the server. The embodiments described herein are not limited to the number of the terminal devices, the network, and/or the server described. That is, the number of terminal devices, networks, and/or servers described herein are provided for descriptive purposes only and are not intended to be limiting.

In accordance with at least some example embodiments, the terminal devices 110, 120, 130, and 140 may be various electronic devices. The various electronic devices may include but not be limited to a mobile device such as a smartphone, a tablet computer, an e-book reader, a laptop computer, a desktop computer, and/or any other suitable electronic devices.

In accordance with at least some example embodiments, the network 160 may be a medium used to provide a communications link between the terminal devices 110, 120, 130, 140 and the server 150. The network 160 may be the Internet, a local area network (LAN), a wide area network (WAN), a local interconnect network (LIN), a cloud, etc. The network 160 may be implemented by various types of connections, such as a wired communications link, a wireless communications link, an optical fiber cable, etc.

In accordance with at least some example embodiments, the server 150 may be a server for providing various services to users using one or more of the terminal devices 110, 120, 130, and 140. The server 150 may be implemented by a distributed server cluster including multiple instances of server 150 or may be implemented by a single server 150.

A user may use one or more of the terminal devices 110, 120, 130, and 140 to interact with the server 150 via the network 160. Various applications or localized interfaces thereof, such as social media applications, online shopping services, or the like, may be installed on the terminal devices 110, 120, 130, and 140.

It is to be understood that software applications or services according to the embodiments described herein and/or according to the services provided by the service providers may be performed by the server 150 and/or the terminal devices 110, 120, 130, and 140 (which may be referred to herein as user devices). Accordingly, the apparatus for the software applications and/or services may be arranged in the server 150 and/or in the terminal devices 110, 120, 130, and 140.

It is also to be understood that when a service is not performed remotely, the system 100 may not include the network 160, but include only the terminal device 110, 120, 130, and 140 and/or the server 150.

It is further to be understood that the terminal device 110, 120, 130, and 140 and/or the server 150 may each include one or more processors, a memory, and a storage device storing one or more programs. The terminal device 110, 120, 130, and 140 and/or the server 150 may also each include an Ethernet connector, a wireless fidelity receptor, etc. The one or more programs, when being executed by the one or more processors, may cause the one or more processors to perform the method(s) described in any embodiments described herein. Also, it is to be understood that a computer readable non-volatile medium may be provided according to the embodiments described herein. The computer readable medium stores computer programs. The computer programs are used to, when being executed by a processor, perform the method(s) described in any embodiments described herein.

Figure 2:
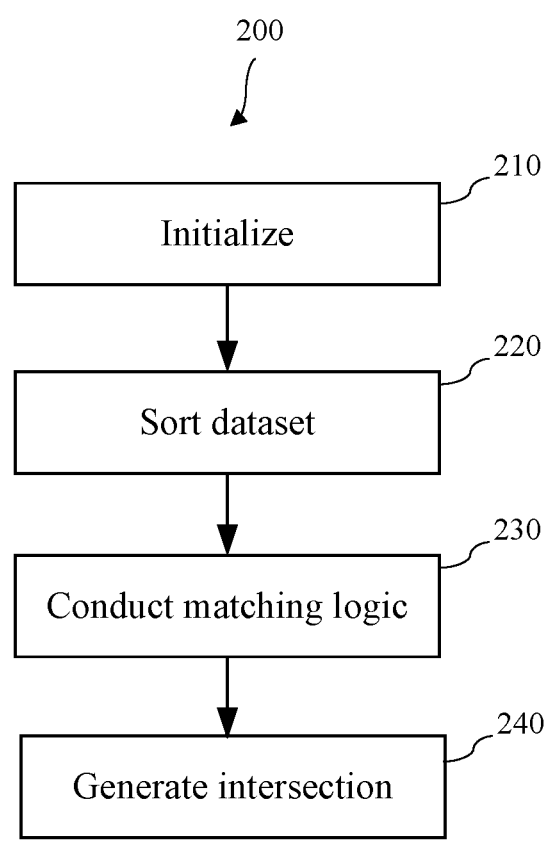
FIG. 2 is a flow chart illustrating an example processing flow for a multi-identification matching algorithm, in accordance with at least some embodiments described herein.

FIG. 2 is a flow chart illustrating an example processing flow 200 for a multi-identification matching algorithm, in accordance with at least some embodiments described herein.

Figure 3:
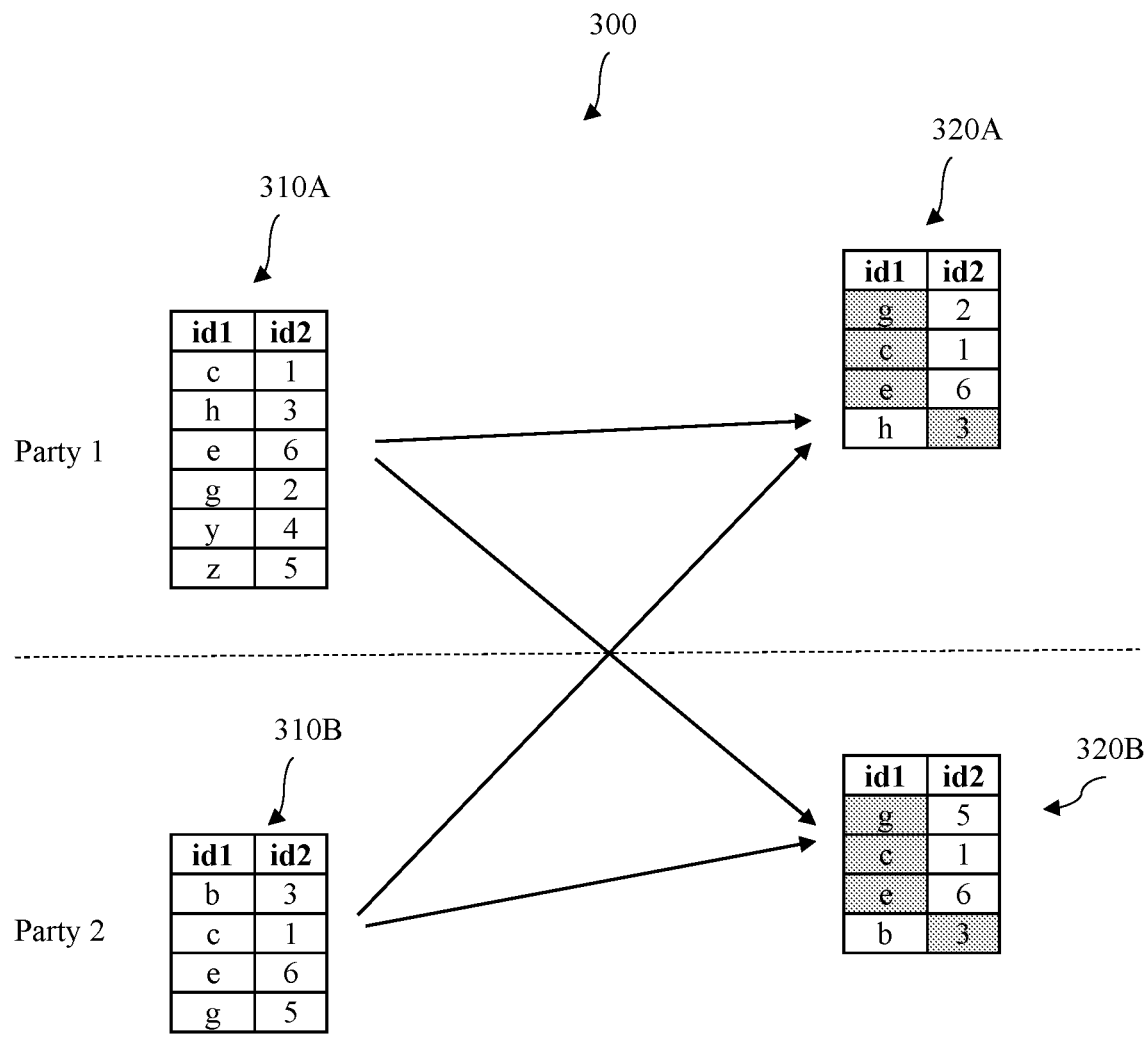
FIG. 3 is a schematic diagram illustrating an example of the processing flow of FIG. 2, in accordance with at least some embodiments described herein.

FIG. 3 is a schematic diagram 300 illustrating an example of the processing flow of FIG. 2, in accordance with at least some embodiments described herein. Thus, the description of processing flow 200 may reference 310A, 310B, 320A, and 320B of schematic diagram 300.

Figure 6:
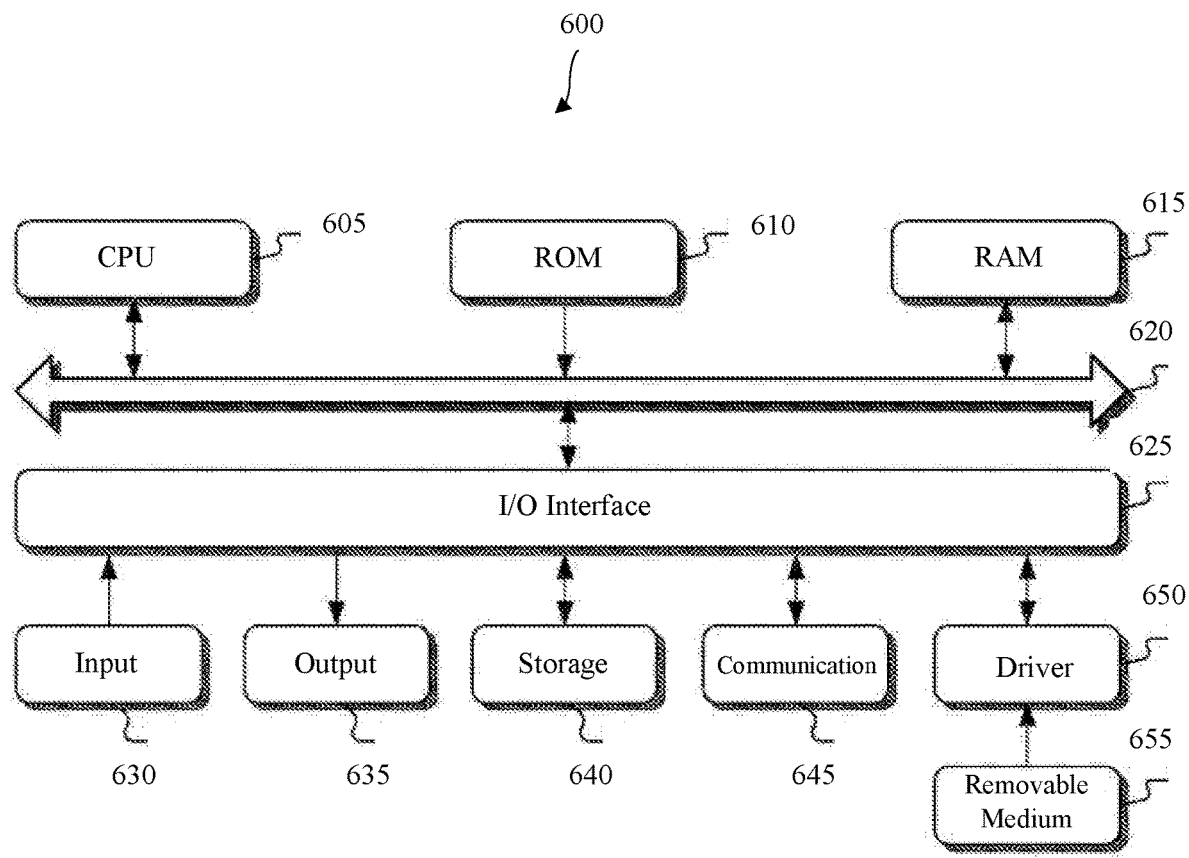
FIG. 6 is a schematic structural diagram of an example computer system applicable to implementing an electronic device, arranged in accordance with at least some embodiments described herein.

It is to be understood that the processing flow 200 disclosed herein can be conducted by one or more processors (e.g., the processor of one or more of the terminal device 110, 120, 130, and 140 of FIG. 1, the processor of the server 150 of FIG. 1, the central processor unit 605 of FIG. 6, and/or any other suitable processor), unless otherwise specified.

It is also to be understood that the processing flow 200 can include one or more operations, actions, or functions as illustrated by one or more of blocks 210, 220, 230, and 240. These various operations, functions, or actions may, for example, correspond to software, program code, or program instructions executable by a processor that causes the functions to be performed. Although illustrated as discrete blocks, obvious modifications may be made, e.g., two or more of the blocks may be re-ordered; further blocks may be added; and various blocks may be divided into additional blocks, combined into fewer blocks, or eliminated, depending on the desired implementation. Processing flow 200 may begin at block 210.

At block 210 (Initialize), the processor for a respective device may perform initialization functions or operations for, e.g., system parameters and/or application parameters. The processor of the respective device may provide a dataset (e.g., 310A) for Party 1, and/or provide a dataset (e.g., 310B) for Party 2. It is to be understood that the datasets 310A and/or 310B may be up-sampled datasets (e.g., 508A and/or 508B of FIG. 5A, etc.) generated or obtained at block 420 of FIG. 4A, described in detail further below.

It is also to be understood that each dataset 310A or 310B may include one or more identification (ID) fields or columns, and that the number of the identification fields or columns of the dataset 310A may or may not be equal to the number of the identification fields or columns of the dataset 310B. As shown in FIG. 3, each of the datasets 310A and 310B includes two ID fields: id1 and id2.

In an example embodiment, the processor of the respective device may shuffle the dataset 310A for Party 1 and/or shuffle the dataset 310B for Party 2. The processor may also transform the ID fields of the dataset 310A using a transforming scheme for Party 1.

It is to be understood that the function or operation to "transform" or of "transforming" a dataset or a portion thereof, e.g., one or more fields/columns (or records/rows) of a dataset such as one or more ID fields/columns (or records/rows), etc., may refer to processing (e.g., encrypting, decrypting, encoding, decoding, manipulating, compressing, decompressing, converting, etc.) the dataset or a portion thereof. It is also to be understood that the "transforming scheme" may refer to an algorithm, protocol, or function of performing the processing (e.g., encrypting, decrypting, encoding, decoding, manipulating, compressing, decompressing, converting, etc.) of the dataset or a portion thereof. In an example embodiment, the processor may encrypt (or decrypt, encode, decode, manipulate, compress, decompress, convert, etc.) the ID fields of the dataset 310A using e.g., a key of Party 1 based on e.g., an ECDH algorithm or protocol.

The processor may also transform the ID fields of the dataset 310B using a transforming scheme for Party 2. In an example embodiment, the processor may encrypt (or decrypt, encode, decode, manipulate, compress, decompress, convert, etc.) the ID fields of the dataset 310B using e.g., a key of Party 2 based on e.g., the ECDH algorithm or protocol.

It is to be understood that for Party 1 and/or Party 2, a sequence of the transforming of the ID fields of the dataset (310A or 310B) and the shuffling of the dataset (310A or 310B) may be switched or changed, without impacting the purpose of the resultant dataset.

The processor of the respective device may further exchange the dataset 310A with the dataset 310B between Party 1 and Party 2. For Party 1, the processor may dispatch or send the dataset 310A to Party 2, and receive or obtain the dataset 310B from Party 2. For Party 2, the processor may dispatch or send the dataset 310B to Party 1, and receive or obtain the dataset 310A from Party 1. It is to be understood that since the dataset 310A and the dataset 310B have been transformed (e.g., encoded, etc.), the corresponding receiving party may not know the real data in the received dataset. It is to be understood that each party may now have a local copy of both the dataset 310A and the dataset 310B.

The processor of the respective device may further transform the ID fields of the received transformed dataset 310B using a transforming scheme for Party 1. In an example embodiment, the processor may encrypt (or decrypt, encode, decode, manipulate, compress, decompress, convert, etc.) the ID fields of the received transformed dataset 310B using a key of Party 1 based on e.g., the ECDH algorithm or protocol. The processor of the respective device may further transform the ID fields of the received transformed dataset 310A using a transforming scheme for Party 2. In an example embodiment, the processor may encrypt (or decrypt, encode, decode, manipulate, compress, decompress, convert, etc.) the ID fields of the received transformed dataset 310A using a key of Party 2 based on e.g., the ECDH algorithm or protocol.

The processor may also shuffle the transformed received transformed dataset 310A for Party 2 and/or the transformed received transformed dataset 310B for Party 1. It is to be understood that for Party 1 and/or Party 2, a sequence of the transforming of ID fields of the received transformed dataset (310A and/or 310B) and the shuffling of the transformed received transformed dataset (310A and/or 310B) may be switched or changed, without impacting the purpose of the resultant dataset. The processor of the respective device may exchange the resultant shuffled dataset 310A (referred to as "310A" in blocks 220-240, to simplify the description) and the resultant shuffled dataset 310B (referred to as "310B" in blocks 220-240, to simplify the description) between Party 2 and Party 1. Processing may proceed from block 210 to block 220.

At block 220 (Sort dataset), the processor of the respective device may sort the dataset 310A and/or the dataset 310B for Party 1 and/or Party 2. For example, for Party 1, the processor may sort the ID fields (id1, id2, etc.) of the dataset 310A in an order (or sequence) corresponding to a predetermined importance or priority level of the ID fields. The dataset 310A may contain ID fields such as the user's name (e.g., having a priority level of 3, etc.), e-mail address (e.g., having a priority level of 2, etc.), phone numbers (e.g., having a priority level of 4, etc.), user's unique ID (e.g., having a priority level of 1, etc.), etc. In an example embodiment, the lower the priority level number is, the more important the corresponding ID field is. Sorting the ID fields of the dataset 310A may result in the user's unique ID (e.g., having a priority level of 1, etc.) being listed as the first field/column in the dataset 310A, the e-mail address (e.g., having a priority level of 2, etc.) being listed as the second field/column in the dataset 310A, the user's name (e.g., having a priority level of 3, etc.) being listed as the third field/column in the dataset 310A, and the phone numbers (e.g., having a priority level of 4, etc.) being listed as the fourth field/column in the dataset 310A. That is, in a non-limiting example of dataset 310A, the ID fields are sorted in ascending order of the number of the priority level: user's unique ID, email addresses, user names, and user phone numbers.

For Party 2, the processor may sort the ID fields (id1, id2, etc.) of the dataset 310B in the same order (or sequence) corresponding to the predetermined importance or priority level of the ID fields, as the order for the dataset 310A for Party 1. It is to be understood that the sorting of the datasets 310A and 310B is to prepare for the subsequent matching process. Processing may proceed from block 220 to block 230.

At block 230 (Conduct matching logic), with datasets 310A and 310B being sorted, the processor of the respective device may, for each ID field (starting from the ID field having the lowest priority level number, up to the ID field having the highest priority level number) of the dataset 310A, search for a match (or an inner join operation, etc.) between the dataset 310A and the dataset 310B to obtain or generate an intersection (dataset 320A of FIG. 3) for Party 1.

It is to be understood that the searching for a match operation (or an inner join operation, etc.) includes: for each ID field of the dataset 310A (starting from the ID field having the lowest priority level number, up to the ID field having the highest priority level number) and for each identification element in the dataset 310A that matches the identification element in the dataset 310B, removing the record (or row) of the dataset 310A that contains a matched identification element, and adding or appending the removed record (or row) of the dataset 310A to the dataset 320A.

For example, as shown in FIG. 3, for the ID field id1 in the dataset 310A, the records/rows containing "g", "c", "e" each has a corresponding match in the dataset 310B and such records/rows may be removed from the dataset 310A; and the removed records/rows may be added or appended to the dataset 320A. For id2 in the dataset 310A, the record/row containing "3" has a corresponding match in the dataset 310B and such record/row may be removed from the dataset 310A; and the removed record/row may be added or appended to the dataset 320A.

The processor of the respective device may, for each ID field (starting from the ID field having the lowest priority level number up to the ID field having the highest priority level number) of the dataset 310B, search for a match (or an inner join operation, etc.) between the dataset 310A and the dataset 310B to obtain or generate an intersection (dataset 320B of FIG. 3) for Party 2.

It is to be understood that the searching for a match operation (or an inner join operation, etc.) includes: for each ID field in the dataset 310B (starting from the ID field having the lowest priority level number, up to the ID field having the highest priority level number) and for each identification element in the dataset 310B that matches the identification element in the dataset 310A, removing the record (or row) of the dataset 310B that contains the matched identification element, and adding or appending the removed record (or row) of the dataset 310B to the dataset 255B.

For example, as shown in FIG. 3, for the ID field id1 in the dataset 310B, the records/rows containing "g", "c", "e" each has a corresponding match in the dataset 310A and such records/rows may be removed from the dataset 310B; and the removed records/rows may be added or appended to the dataset 320B. For id2 in the dataset 310B, the record/row containing "3" has a corresponding match in the dataset 310A and such record/row may be removed from the dataset 310B; and the removed record/row may be added or appended to the dataset 320B.

It is to be understood that the conducting matching logic/algorithm operations may be performed until all ID fields of the dataset 310A are processed for Party 1, and/or all ID fields of the dataset 310B are processed for Party 2. Processing may proceed from block 230 to block 240.

At block 240 (Generate intersection), the processor of the respective device may generate the intersection/dataset 320A for Party 1 when all ID fields of the dataset 310A are processed. The processor of the respective device may generate the intersection/dataset 320B for Party 2 when all ID fields of the dataset 310B are processed.

It is to be understood that the intersections 320A and/or 320B may be used for further MPC processing such as generating secret shares based on the intersections 320A and/or 320B, gathering secret shares, and/or generating the results by combining gathered secret shares, etc.

Figure 4A:
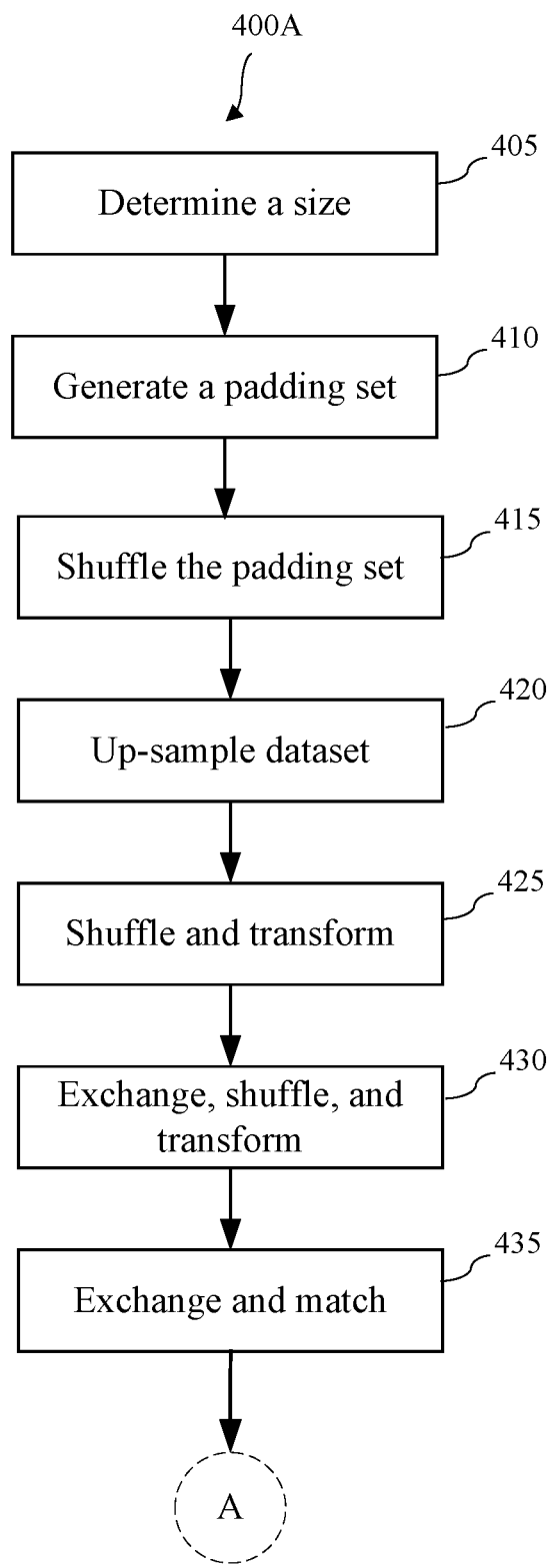
FIGS. 4A and 4B are flow charts illustrating an example processing flow for protecting membership privacy in secure multi-party computation and communication, in accordance with at least some embodiments described herein.
Figure 4B:
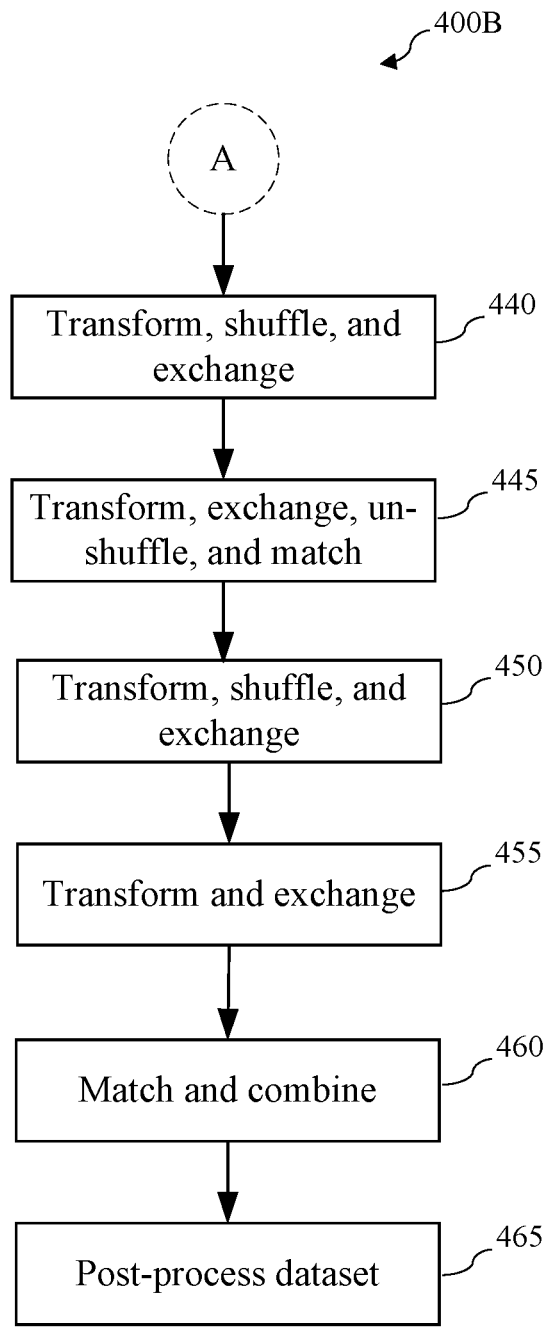

FIGS. 4A and 4B are flow charts illustrating progressive portions 400A and 400B, respectively, of an example processing flow for protecting membership privacy in secure multi-party computation and communication, in accordance with at least some embodiments described herein.

FIGS. 5A-5F show progressive portions (500A-500F) of a schematic diagram illustrating an example of the processing flows of FIGS. 4A and 4B, in accordance with at least some embodiments described herein.

It is to be understood that the processing flow (400A and 400B) disclosed herein can be conducted by one or more processors (e.g., the processor of one or more of the terminal device 110, 120, 130, and 140 of FIG. 1, the processor of the server 150 of FIG. 1, the central processor unit 605 of FIG. 6, and/or any other suitable processor), unless otherwise specified.

It is also to be understood that the processing flow (400A and 400B) can include one or more operations, actions, or functions as illustrated by one or more of blocks 405, 410, 415, 420, 425, 430, 435, 440, 445, 450, 455, 460, and 465. These various operations, functions, or actions may, for example, correspond to software, program code, or program instructions executable by a processor that causes the functions to be performed. Although illustrated as discrete blocks, obvious modifications may be made, e.g., two or more of the blocks may be re-ordered; further blocks may be added; and various blocks may be divided into additional blocks, combined into fewer blocks, or eliminated, depending on the desired implementation. It is to be understood that before the processing flow (400A and 400B), operations including initializations or the like may be performed. For example, system parameters and/or application parameters may be initialized. Processing flow (400A and 400B) may begin at block 405.

At block 405 (Determine a size), the processor may determine a dataset size N (i.e., a number) that is to be used for generating padding/filling dataset(s) to achieve a desired membership privacy protection goal or performance (described in detail further below). It is to be understood that the size N is to be determined to ensure that a membership privacy configuration and/or privacy requirement is met or satisfied. In an example embodiment, the membership privacy configuration and/or privacy requirement may include configurations and/or requirement(s) (described in details below) defined in a differential privacy protocol or algorithm. Processing may proceed from block 405 to block 410.

At block 410 (Generate a padding set), the processor of the respective device may provide a dataset (e.g., 502A of FIG. 5A) for Party A, and/or provide a dataset (e.g., 502B) for Party B. It is to be understood that the operations or functions described in the processing flow (400A and 400B) may be symmetrical for Party A and Party B. It is also to be understood that the format, content, and/or arrangement of the datasets described herein are for descriptive purposes only and are not intended to be limiting.

In an example embodiment, the dataset 502A may have more than one ID field (ID column: idA1, idA2, idA3, etc.) and/or have zero or one or more features or attributes (columns) associated with the ID fields. In an example embodiment, the ID field idA1 may represent the usernames, the ID field idA2 may represent the e-mail addresses, and the ID field idA3 may represent the phone numbers.

In an example embodiment, the dataset 502B may have more than one ID field (ID column: idB1, idB2, idB3, etc.) and/or have zero or one or more features or attributes (columns) associated with the ID fields. In an example embodiment, the ID field idB1 may represent the usernames, the ID field idB2 may represent the e-mail addresses, and the ID field idB2 may represent the phone numbers.

Figure 5A:
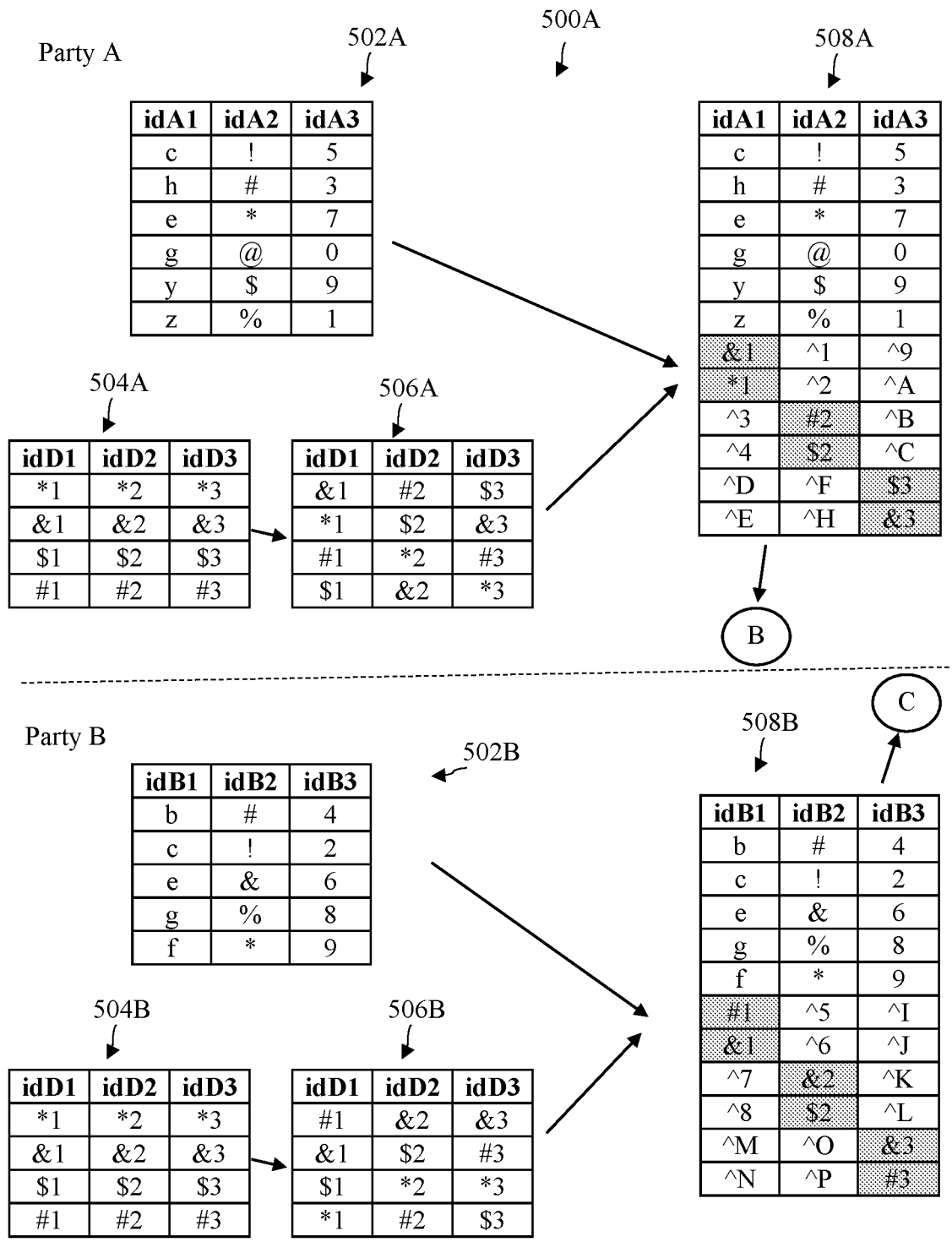
FIGS. 5A-5F show portions of a schematic diagram illustrating an example of the processing flows of FIGS. 4A and 4B, in accordance with at least some embodiments described herein.

For each ID field of dataset 502A (starting from the first ID field idA1 to the last ID field idA3) and/or 502B (starting from the first ID field idB1 to the last ID field idB3), the processor may generate a respective field (e.g., idD1, idD2, idD3, etc.) in the dataset (e.g., 504A and/or 504B of FIG. 5A). It is to be understood that the dataset (504A or 504B) may be a padding or filling dataset that is commonly used or shared by both Party A and Party B (e.g., the processor may provide a local copy 504B of the dataset 504A to Party B, or a local copy 504A of the dataset 504B to Party A). In an example embodiment, each of the datasets (504A, 504B) has a size of 2*N (see description of block 405). In other example embodiments, each of the datasets (504A, 504B) may have a size that is equal to or greater than N.

It is to be understood that a size of a dataset (e.g., 504A or 504B, etc.) may refer to the number of records (or rows, elements, etc.) of the dataset (e.g., 504A or 504B, etc.). It is also to be understood that when each of the datasets (504A, 504B) has a size of 2*N, the subsequent operations such as the PSI operations or MPC operations on the up-sampled datasets (e.g., 508A of FIG. 5A for party A and/or 508B of FIG. 5A for party B, described in detail further below) may guarantee being ($\epsilon$, $\delta$)-differentially private (described and/or defined below) for both Party A and/or Party B. In an example embodiment, E and/orb may be predetermined to achieve a desired membership privacy protection goal or performance.

Features (e.g., the determined size N, etc.) in the embodiments disclosed herein may be "($\epsilon$, $\delta$)-differentially private" (i.e., "differentially private" based on the $\epsilon$ and $\delta$) for the predetermined $\epsilon$ and $\delta$. That is, the size N may be determined based on the predetermined $\epsilon$ and $\delta$, such that being "($\epsilon$, $\delta$)-differentially private" may be achieved for the subsequent operations such as the PSI operations or MPC operations on the up-sampled datasets (i.e., the subsequent operations are "differentially private" based on the $\epsilon$ and $\delta$).

It is to be understood that the above configuration or requirement of the differential privacy protocol or algorithm may refer to a measure of "how much data privacy is afforded (e.g., by a query on the input dataset) to perform the operations or functions?" The measurable set E may refer to all potential output of M that may be predicted. The first parameter "$\epsilon$" may refer to a privacy budget (i.e., a limit of how much privacy leaking is acceptable), e.g., indicating a maximum difference between a query on dataset A and the same query on dataset A'. The smaller the value of $\epsilon$ is, the stronger the privacy protection is for the multi-identification privacy-protection mechanism. The second parameter "δ" may refer to a probability, such as a probability of information being accidentally leaked. In an example embodiment, a required or predetermined value of E may range from at or about 1 to at or about 3. The required or predetermined value of δ may range from at or about $10^{-10}$ (or at about $10^{-8}$) to at or about $10^{-6}$. To achieve, meet, satisfy, or guarantee the requirement to be (ϵ, δ)-differentially private, the value of N may be at or about a few thousands.

In an example embodiment, the relationship among ϵ, δ, and N may be determined by predetermined or predefined algorithms. That is, the size N may be determined following a pre-calibrated or predetermined noise distribution, e.g., based on the required or predetermined ϵ and δ, such that being "(ϵ, δ)-differentially private" may be achieved for the subsequent operations such as the PSI operations or MPC operations on the up-sampled datasets.

It is also to be understood that the datasets (504A, 504B) are generated such that the intersection (e.g., a result of an inner join operation) of the ID field (idD1) in the dataset (504A or 504B) and its corresponding ID field (idA1 or idB1) in the dataset 502A for party A and the dataset 502B for Party B is empty (i.e., having a size of zero), that the intersection of the ID field (idD2) in the dataset (504A or 504B) and its corresponding ID field (idA2 or idB2) in the dataset 502A for party A and the dataset 502B for Party B is empty (i.e., having a size of zero), and that the intersection of the ID field (idD3) in the dataset (504A or 504B) and its corresponding ID field (idA3 or idB3) in the dataset 502A for party A and the dataset 502B for Party B is empty (i.e., having a size of zero). That is, there is no common or shared element between idD1 and idA1 (and/or idD1 and idB1), there is no common or shared element between idD2 and idA2 (and/or idD2 and idB2), and there is no common or shared element between idD3 and idA3 (and/or idD3 and idB3). Processing may proceed from block 410 to block 415.

At block 415 (Shuffle the padding set), the processor of the respective device may shuffle (e.g., randomly permute) each ID field (idD1, idD2, and idD3) of the datasets (504A, 504B) independently for Party A and for Party B, to produce a corresponding shuffled dataset (e.g., 506A of FIG. 5A) for Party A, and to produce a corresponding shuffled dataset (e.g., 506B of FIG. 5A) for Party B. Processing may proceed from block 415 to block 420.

At block 420 (Up-sample dataset), for each ID field (from the first ID field (idA1 or idB1) up to the last ID field (idA3 or idB3)) in the dataset 502A for Party A and in the dataset 502B for Party B, the processor of the respective device may up-sample the corresponding ID field in the dataset 502A for Party A and/or in the dataset 502B for Party B. It is to be understood that the up-sampling of the corresponding ID field in the dataset 502A may include (1) selecting or obtaining the first N elements (or records, rows, etc.) of the respective ID field (idD1, idD2, idD3) in the dataset 506A, and (2) generating a union (resulting the corresponding ID fields in the dataset 508A of FIG. 5A) of the corresponding ID field in the dataset 502A and the first N elements of the respective ID field (idD1, idD2, idD3) in the dataset 506A, and (3) inserting N random numbers/elements into other fields of the dataset 508A that are in the same records/rows as the added/inserted/appended first N elements of the respective ID field (idD1, idD2, idD3) in the dataset 506A.

For example, as shown in FIG. 5A, N is determined to be 2 in block 405. For idA1 of the dataset 502A, the first N elements (or records, rows, etc.) of the ID field idD1 of the dataset 506A is selected or obtained. A union of the first N elements of the ID field idD1 of the dataset 506A and the idA1 field of the dataset 502A is generated to result in the idA1 field of the dataset 508A. N random numbers/elements are inserted into each of the other fields (idA2, idA3, etc.) of the dataset 508A that are in the same records/rows as the added/inserted/appended first N elements of the ID field idD1 of the dataset 506A. It is to be understood that any one of the N random numbers/elements has empty intersection with any other elements in the resultant dataset 508A for Party A, and has empty intersection with any elements in the resultant up-sampled dataset 508B for Party B.

For idA2 of the dataset 502A, the first N elements (or records, rows, etc.) of the ID field idD2 of the dataset 506A is selected or obtained. A union of the first N elements of the ID field idD2 of the dataset 506A and the idA2 field of the dataset 502A (expanded with the inserted 1*N random numbers/elements) is generated to result in the idA2 field of the dataset 508A. N random numbers/elements are inserted into each of the other fields (idA1, idA3, etc.) of the dataset 508A that are in the same records/rows as the added/inserted/appended first N elements of the ID field idD2 of the dataset 506A. It is to be understood that any one of the N random numbers/elements has empty intersection with any other elements in the resultant dataset 508A for Party A, and has empty intersection with any elements in the resultant up-sampled dataset 508B for Party B.

For idA3 of the dataset 502A, the first N elements (or records, rows, etc.) of the ID field idD3 of the dataset 506A is selected or obtained. A union of the first N elements of the ID field idD3 of the dataset 506A and the idA3 field of the dataset 502A (expanded with the inserted 2*N random numbers/elements) is generated to result in the idA3 field of the dataset 508A. N random numbers/elements are inserted into each of the other fields (idA1, idA2, etc.) of the dataset 508A that are in the same records/rows as the added/inserted/appended first N elements of the ID field idD3 of the dataset 506A. It is to be understood that any one of the N random numbers/elements has empty intersection with any other elements in the resultant dataset 508A for Party A, and has empty intersection with any elements in the resultant up-sampled dataset 508B for Party B.

It is also to be understood that the up-sampled dataset 508A may be used as the dataset 310A of FIG. 3. Similarly, the ID fields (idB1, idB2, idB3) of the dataset 502B for Party B may also be up-sampled using independently shuffled respective ID fields (idD1, idD2, idD3) of the dataset 506B to generate an up-sampled dataset (e.g., 508B of FIG. 5A or 310B of FIG. 3).

It is to be understood that the processor of the respective device may process the up-sampled dataset 508A for Party A and/or the up-sampled dataset 508B for Party B, to generate intersections (without revealing the real size of the intersection because of the padding/filling elements and the random numbers/elements being inserted in the up-sampled datasets for Party A and/or Party B) for further process. It is also to be understood that a size of the intersection of the up-sampled dataset 508A of Party A and the up-sampled dataset 508B of Party B does not reveal the real intersection size of the original datasets (e.g., 502A for Party A and 502B for Party B) due to the introducing of the datasets (504A, 504B) and the random numbers/elements for up-sampling. That is, features in the embodiments disclosed herein may lead to the intersection size revealed in the subsequent PSI operations or MPC operations being random and differentially private, making it almost impossible for an attacker to determine a user's membership based on the size of the intersection.

As shown in FIG. 5A, in an example embodiment, the dataset 508A includes multiple records (rows), each record including a first member or user identification (idA1), a second member or user identification (idA2), and a third member or user identification (idA3). The dataset 508B includes multiple records (rows), each record including a first member or user identification (idB1), a second member or user identification (idB2), and a third member or user identification (idB3). It is to be understood that the format, content, and/or arrangement of the dataset 508A and/or 508B are for descriptive purposes only and are not intended to be limiting. For example, each dataset 508A or 508B may have one or more IDs (columns) and/or zero or one or more features or attributes (columns) associated with the ID or IDs.

It is to be understood that, for various reason(s), Party A and/or Party B may not want to reveal to the other party at least portions of data in the dataset 508A and/or the dataset 508B, respectively, and/or in the intersection of the dataset 508A and the dataset 508B. Processing may proceed from block 420 to block 425.

Figure 5B:
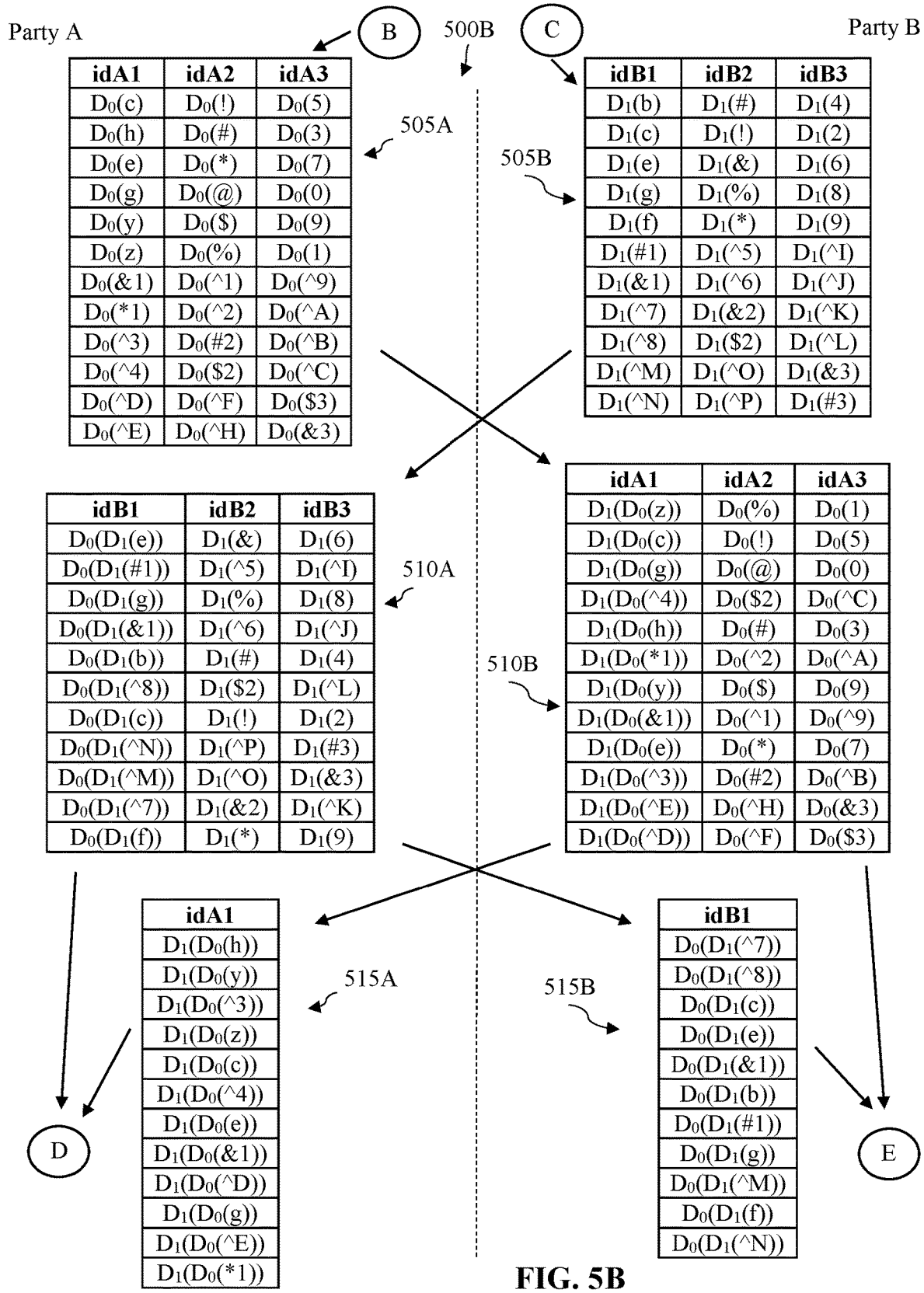

At block 425 (Shuffle and transform), the processor may transform the ID fields (columns, idA1, idA2, and idA3) of the dataset 508A using a transforming scheme for Party A (to obtain or generate the dataset 505A of FIG. 5B). It is to be understood that the function or operation to "transform" or of "transforming" a dataset or a portion thereof, e.g., one or more columns (or rows) of a dataset such as one or more identification fields/columns (or records/rows), etc., may refer to processing (e.g., encrypting, decrypting, encoding, decoding, manipulating, compressing, decompressing, converting, etc.) the dataset or a portion thereof. It is also to be understood that the "transforming scheme" may refer to an algorithm, protocol, or function of performing the processing (e.g., encrypting, decrypting, encoding, decoding, manipulating, compressing, decompressing, converting, etc.) of the dataset or a portion thereof. In an example embodiment, the processor may encrypt (or decrypt, encode, decode, manipulate, compress, decompress, convert, etc.) the ID of the dataset 508A (to obtain or generate the dataset 505A) using e.g., a key of Party A based on an ECDH algorithm or protocol (represented by the function $D_0(.)$).

The processor may also transform the ID fields (idB1, idB2, and idB3) of the dataset 508B using a transforming scheme for Party B (to obtain or generate the dataset 505B of FIG. 5B). In an example embodiment, the processor may encrypt (or decrypt, encode, decode, manipulate, compress, decompress, convert, etc.) the ID of the dataset 508B (to obtain or generate the dataset 505B) using e.g., a key of Party B based on the ECDH algorithm or protocol (represented by the function $D_1(.)$).

The processor of the respective device may shuffle (e.g., randomly permute, etc.) the dataset 505A for Party A, and/or shuffle the dataset 505B for Party B.

It is to be understood that at block 425, for Party A and/or Party B, a sequence of the transforming of the dataset and the shuffling of the dataset may be switched or changed, without impacting the purpose of the resultant dataset. For example, the processor may shuffle the dataset 508A, and then transform the shuffled dataset to obtain or generate the dataset 505A for Party A. The processor may also shuffle the dataset 508B, and then transform the shuffled dataset to obtain or generate the dataset 505B for Party B. Processing may proceed from block 425 to block 430.

At block 430 (Exchange, shuffle, and transform), the processor of the respective device may exchange the dataset 505A (after being shuffled) with the dataset 505B (after being shuffled) between Party A and Party B. For Party A, the processor may dispatch or send the dataset 505A (after being shuffled) to Party B, and receive or obtain the dataset 505B (after being shuffled) from Party B as dataset 510A (see FIG. 5B). For Party B, the processor may dispatch or send the dataset 505B (after being shuffled) to Party A, and receive or obtain the dataset 505A (after being shuffled) from Party A as dataset 510B (see FIG. 5B). It is to be understood that since the dataset 505A and the dataset 505B have been transformed (e.g., encoded, etc.), the corresponding receiving party may not know the real data in the received dataset.

The processor may further transform the ID field (idB1) of the dataset 510A using a transforming scheme for Party A. In an example embodiment, the processor may encrypt (or decrypt, encode, decode, manipulate, compress, decompress, convert, etc.) the ID field (idB1) of the dataset 510A using a key of Party A based on the ECDH algorithm or protocol (represented by the function $D_0(.)$). The processor may further transform the ID field (idA1) of the dataset 510B using a transforming scheme for Party B. In an example embodiment, the processor may encrypt (or decrypt, encode, decode, manipulate, compress, decompress, convert, etc.) the ID field (idA1) of the dataset 510B using a key of Party B based on the ECDH algorithm or protocol (represented by the function $D_1(.)$). It is to be understood that the results of the functions $D_1(D_0(p))$ and $D_0(D_1(p))$ may be the same for a same parameter "p".

The processor may also shuffle the dataset 510A for Party A, and/or shuffle the dataset 510B for Party B. It is to be understood that at block 430, for Party A and/or Party B, a sequence of the transforming of the ID field of the dataset and the shuffling of the dataset may be switched or changed, without impacting the purpose of the resultant dataset. For example, the processor may shuffle the dataset 510A, and then transform the shuffled dataset 510A for Party A. The processor may also shuffle the dataset 510B, and then transform the dataset 510B for Party B. Processing may proceed from block 430 to block 435.

At block 435 (Exchange and match), the processor of the respective device may extract the ID field (idA1) of the dataset 510B (after being shuffled) to obtain or generate the dataset 515A for Party A, and/or extract the ID field (idB1) of the dataset 510A (after being shuffled) to obtain or generate the dataset 515B for Party B. The processor of the respective device may also exchange the extracted dataset 510A (the idB1 field, after being shuffled) with the extracted dataset 510B (the idA1 field, after being shuffled) between Party A and Party B. For Party A, the processor may dispatch or send the extracted dataset 510A (the idB1 field, after being shuffled) to Party B, and receive or obtain the extracted dataset 510B (the idA1 field, after being shuffled) from Party B as dataset 515A. For Party B, the processor may dispatch or send the extracted dataset 510B (the idA1 field, after being shuffled) to Party A, and receive or obtain the extracted dataset 510A (the idB1 field, after being shuffled) from Party A as dataset 515B.

The processor may also perform search for a match (or an inner join operation, etc.) between the dataset 510A and the dataset 515A to obtain or generate an intersection (dataset 520A of FIG. 5C) for Party A. It is to be understood that the above operation includes for each identification in the dataset 515A that matches the identification in the dataset 510A, adding or appending the record (or row) of the dataset 510A that contains the matched identification to the dataset 520A, and removing the record (or row) that contains the matched identification from the dataset 510A to obtain or generate a resultant dataset 525A.

The processor may also perform search for a match (or an inner join operation, etc.) between the dataset 510B and the dataset 515B to obtain or generate an intersection (dataset 520B of FIG. 5C) for Party B. It is to be understood that the above operation includes for each identification in the dataset 515B that matches the identification in the dataset 510B, adding or appending the record (or row) of the dataset 510B that contains the matched identification to the dataset 520B, and removing the record (or row) that contains the matched identification from the dataset 510B to obtain or generate a resultant dataset 525B.

It is to be understood that in an example embodiment, the idB2 and idB3 fields in the dataset/intersection 520A may be optional since the matching is based on idB1 (which has a higher priority than idB2 and idB3). The idA2 and idA3 fields in the dataset/intersection 520B may be optional since the matching is based on idA1 (which has a higher priority than idA2 and idA3). It is also to be understood that the dataset 525A includes all the unmatched records (rows) of the dataset 510A. The dataset 525B includes all the unmatched records (rows) of the dataset 510B.

It is to be understood that for Party A, data in the intersection 520A are also transformed (e.g., encoded, etc.) by Party B (e.g., via $D_1(.)$, etc.), and thus Party A may not know the real data in the intersection 520A. For Party B, data in the intersection 520B are also transformed (e.g., encoded, etc.) by Party A (e.g., via $D_0(.)$, etc.), and thus Party B may not know the real data in the intersection 520B. That is, the matching or inner join operation conducted, as described above, is a "private" matching or inner join operation. The processor performs a private identity matching without revealing the intersection of datasets of the two parties. Processing may proceed from block 435 to block 440.

Figure 5C:
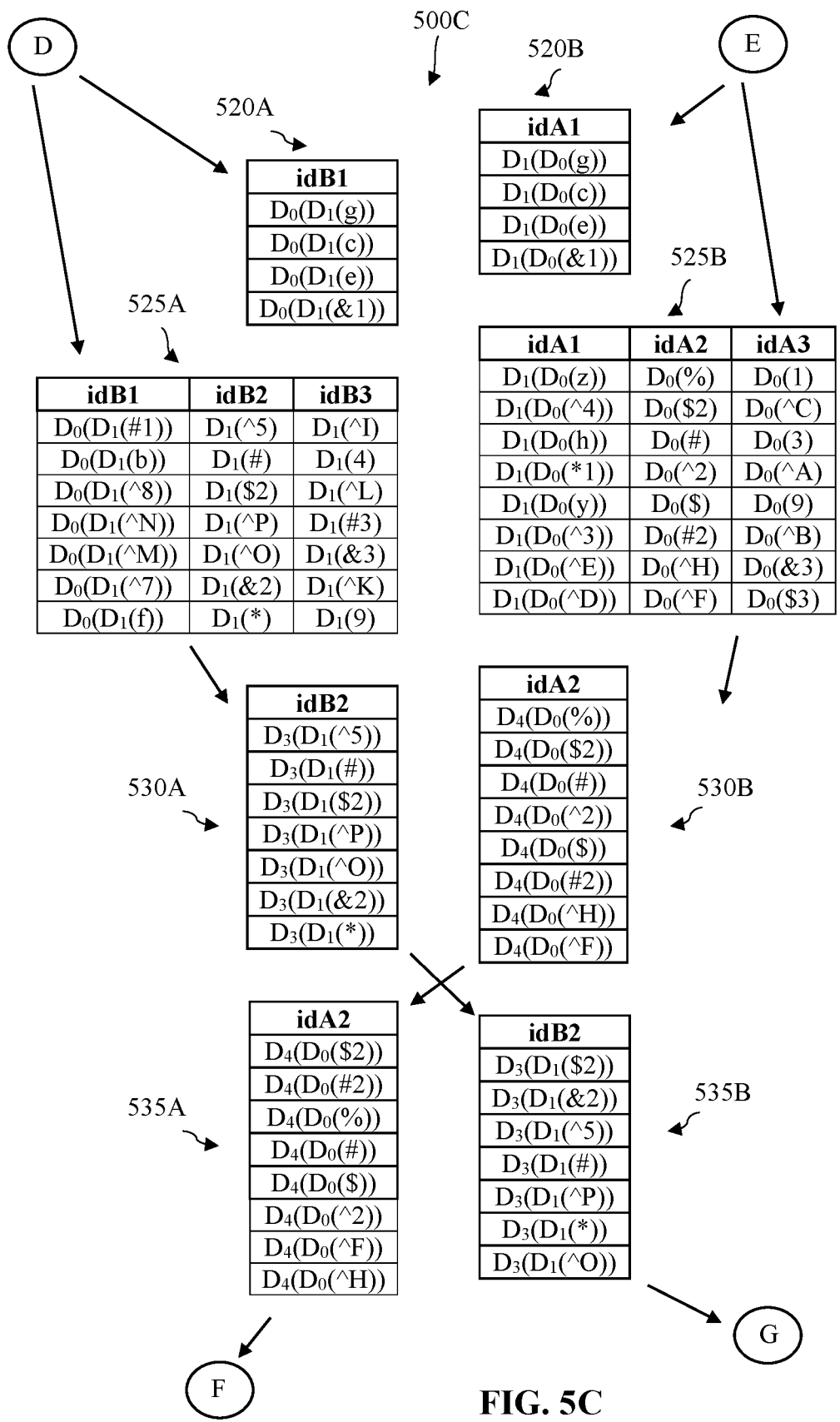

At block 440 (Transform, shuffle, and exchange), the processor of the respective device may transform the ID field (column, idB2) of the dataset 525A using a transforming scheme for Party A (to obtain or generate the dataset 530A of FIG. 5C). In an example embodiment, the processor may encrypt (or decrypt, encode, decode, manipulate, compress, decompress, convert, etc.) the ID field idB2 of the dataset 525A (to obtain or generate the dataset 530A) using e.g., another key of Party A based on an ECDH algorithm or protocol (represented by the function $D_3(.)$).

The processor may also transform the ID field (idA2) of the dataset 525B using a transforming scheme for Party B (to obtain or generate the dataset 530B of FIG. 5C). In an example embodiment, the processor may encrypt (or decrypt, encode, decode, manipulate, compress, decompress, convert, etc.) the ID field idA2 of the dataset 525B (to obtain or generate the dataset 530B) using e.g., another key of Party B based on the ECDH algorithm or protocol (represented by the function $D_4(.)$).

The processor of the respective device may shuffle (e.g., randomly permute, etc.) the dataset 530A for Party A, and/or shuffle the dataset 530B for Party B. The processor of the respective device may also record, save, keep, or otherwise preserve the permutation of the shuffling of the dataset 530A and/or the permutation of the shuffling of the dataset 530B (to prepare for the un-shuffling process at block 445).

It is to be understood that at block 440, for Party A and/or Party B, a sequence of the transforming of the dataset and the shuffling of the dataset may be switched or changed, without impacting the purpose of the resultant dataset. For example, the processor may shuffle the dataset 530A, and then transform the shuffled dataset 530A for Party A. The processor may also shuffle the dataset 530B, and then transform the shuffled dataset 530B for Party B.

The processor of the respective device may exchange the dataset 530A (after being shuffled) with the dataset 530B (after being shuffled) between Party A and Party B. For Party A, the processor may dispatch or send the dataset 530A (after being shuffled) to Party B, and receive or obtain the dataset 530B (after being shuffled) from Party B as dataset 535A (see FIG. 5C). For Party B, the processor may dispatch or send the dataset 530B (after being shuffled) to Party A, and receive or obtain the dataset 530A (after being shuffled) from Party A as dataset 535B (see FIG. 5C). It is to be understood that since the dataset 530A and the dataset 530B have been transformed (e.g., encoded, etc.), the corresponding receiving party may not know the real data in the received dataset. Processing may proceed from block 440 to block 445.

Figure 5D:
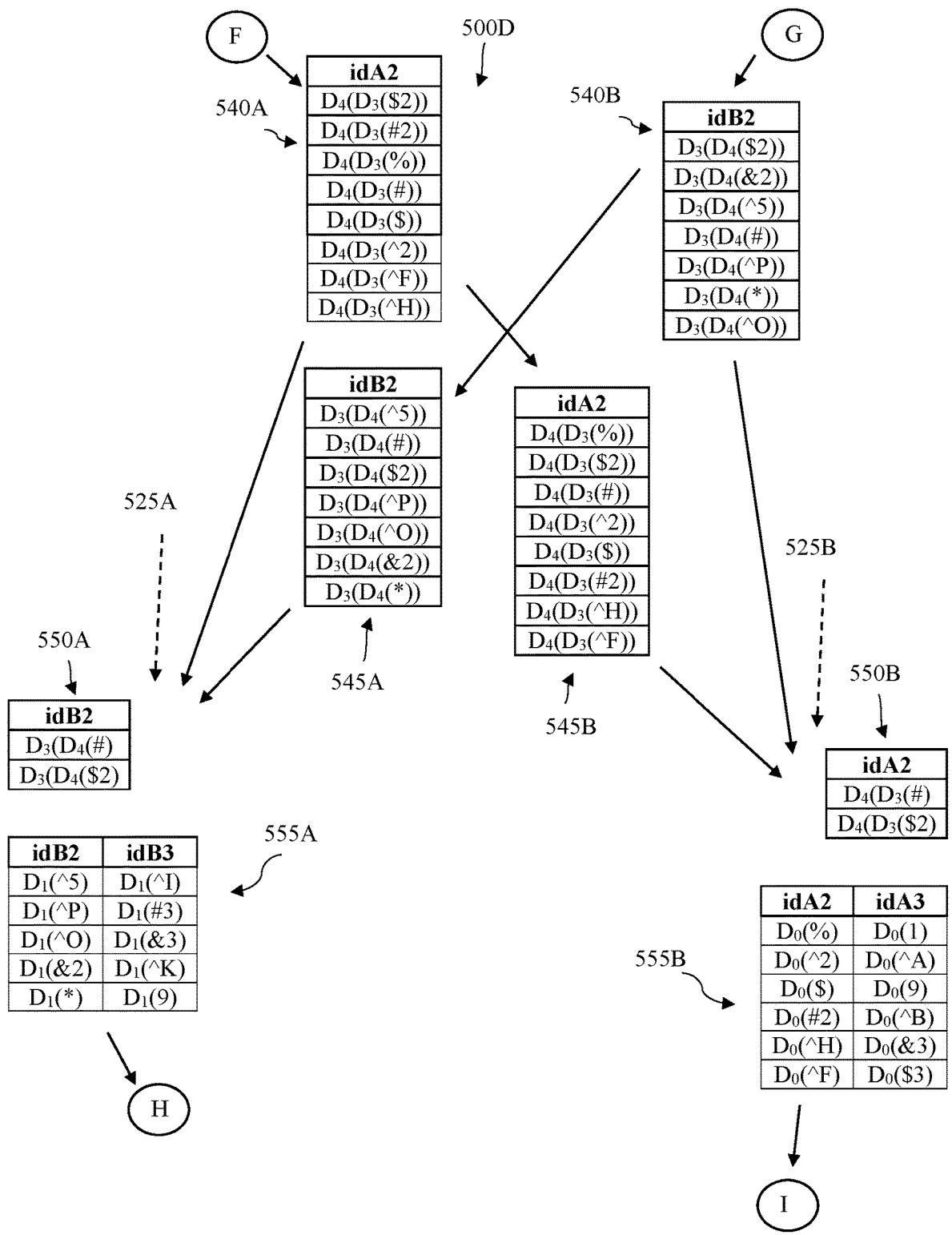

At block 445 (Transform, exchange, un-shuffle, and match), the processor of the respective device may transform the dataset 535A using a transforming scheme for Party A (to obtain or generate the dataset 540A of FIG. 5D). In an example embodiment, the processor may decrypt (or encrypt, encode, decode, manipulate, compress, decompress, convert, etc.) the dataset 535A using e.g., a key of Party A based on an ECDH algorithm or protocol (represented by the function $D_0(.)$), and then encrypt (or decrypt, encode, decode, manipulate, compress, decompress, convert, etc.) the dataset 535A (to obtain or generate the dataset 540A) using e.g., the other key of Party A based on an ECDH algorithm or protocol (represented by the function $D_3(.)$). That is, the dataset 535A is de-transformed (e.g., to remove the key $D_0(.)$) and then transformed again (to add the key $D_3(.)$) to obtain or generate the dataset 540A.

The processor may also transform the dataset 535B using a transforming scheme for Party B (to obtain or generate the dataset 540B of FIG. 5D). In an example embodiment, the processor may decrypt (or encrypt, encode, decode, manipulate, compress, decompress, convert, etc.) the dataset 535B using e.g., a key of Party B based on the ECDH algorithm or protocol (represented by the function $D_1(.)$), and then encrypt (or decrypt, encode, decode, manipulate, compress, decompress, convert, etc.) the dataset 535B (to obtain or generate the dataset 540B) using e.g., the other key of Party B based on the ECDH algorithm or protocol (represented by the function $D_4(.)$). That is, the dataset 535B is de-transformed (e.g., to remove the key $D_1(.)$) and then transformed again (to add the key $D_4(.)$) to obtain or generate the dataset 540B. It is to be understood that the results of the functions $D_3(D_4(p))$ and $D_4(D_3(p))$ may be the same for a same parameter "p".

The processor of the respective device may exchange the dataset 540A with the dataset 540B between Party A and Party B. For Party A, the processor may dispatch or send the dataset 540A to Party B, and receive or obtain the dataset 540B from Party B as dataset 545A (see FIG. 5D). For Party B, the processor may dispatch or send the dataset 540B to Party A, and receive or obtain the dataset 540A from Party A as dataset 545B (see FIG. 5D).

The processor of the respective device may un-shuffle the dataset 545A for Party A based on the permutation (of the shuffling of the dataset 530A) preserved at block 440, such that the records (rows) in the dataset 545A and in the dataset 530A have a same sequence or order (except the transforming scheme being used on the records/rows). The processor of the respective device may also un-shuffle the dataset 545B for Party B based on the permutation (of the shuffling of the dataset 530B) preserved at block 440, such that the records (rows) in the dataset 545B and in the dataset 530B have a same sequence or order (except the transforming scheme being used on the records/rows).

The processor of the respective device may perform search for a match (or an inner join operation, etc.) between the dataset 540A and the dataset 545A to obtain or generate an intersection (dataset 550A of FIG. 5D) for Party A. It is to be understood that the above operation includes for each identification in the dataset 545A that matches the identification in the dataset 540A, adding or appending the record (or row) of the dataset 545A that contains the matched identification to the dataset 550A, adding or appending the remaining ID fields (e.g., idB1, idB3) of the corresponding record (or row) of the dataset 525A to the dataset 550A, and then removing the corresponding record (or row) of the dataset 525A to obtain or generate a resultant dataset 555A. It is to be understood that since the records of the dataset 545A have a same sequence or order as the records of the dataset 530A (which is extracted from the dataset 525A), the remaining ID fields (e.g., idB1, IdB3) of the corresponding record (or row) of the dataset 525A are associated with the corresponding IDs of the dataset 545A. It is also to be understood that for dataset 550A, the ID field idB3 may be optional since the matching is based on idB2. For dataset 555A, the ID field idB1 may be optional since the matching is based on idB2.

The processor may also perform search for a match (or an inner join operation, etc.) between the dataset 540B and the dataset 545B to obtain or generate an intersection (dataset 550B of FIG. 5D) for Party B. It is to be understood that the above operation includes for each identification in the dataset 545B that matches the identification in the dataset 540B, adding or appending the record (or row) of the dataset 545B that contains the matched identification to the dataset 550B, adding or appending the remaining ID fields (e.g., idA1, idA3) of the corresponding record (or row) of the dataset 525B to the dataset 550B, and then removing the corresponding record (or row) of the dataset 525B to obtain or generate a resultant dataset 555B. It is to be understood that since the records of the dataset 545B have a same sequence or order as the records of the dataset 530B (which is extracted from the dataset 525B), the remaining ID fields (e.g., idA1, idA3) of the corresponding record (or row) of the dataset 525B are associated with the corresponding IDs of the dataset 545B. It is also to be understood that for dataset 550B, the ID field idA3 may be optional since the matching is based on idA2. For dataset 555B, the ID field idA1 may be optional since the matching is based on idA2.

It is to be understood that in an example embodiment, the idB1 field in the dataset/intersection 550A may also be optional since the matching is based on idB2 (after idB1 being mismatched in dataset 525A). The idA1 field in the dataset/intersection 550B may also be optional since the matching is based on idA2 (after idA1 being mismatched in dataset 525B).

It is to be understood that for Party A, data in the intersection 550A are also transformed (e.g., encoded, etc.) by Party B (e.g., via $D_4(.)$), and thus Party A may not know the real data in the intersection 550A. For Party B, data in the intersection 550B are also transformed (e.g., encoded, etc.) by Party A (e.g., via $D_3(.)$), and thus Party B may not know the real data in the intersection 550B. That is, the matching or inner join operation conducted, as described above, is a "private" matching or inner join operation. The processor performs a private identity matching without revealing the intersection of datasets of the two parties. Processing may proceed from block 445 to block 450.

Figure 5E:
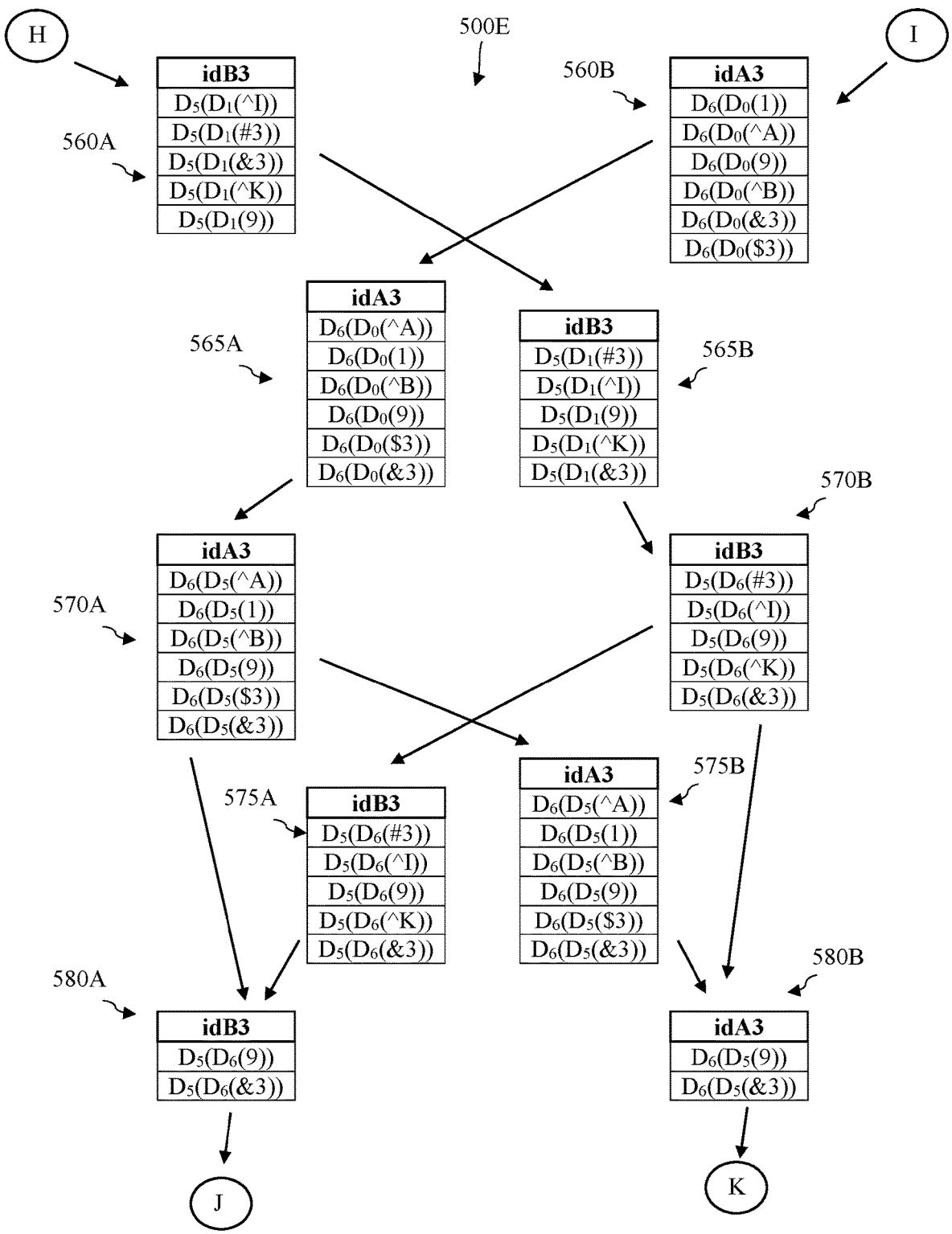
Figure 5F:
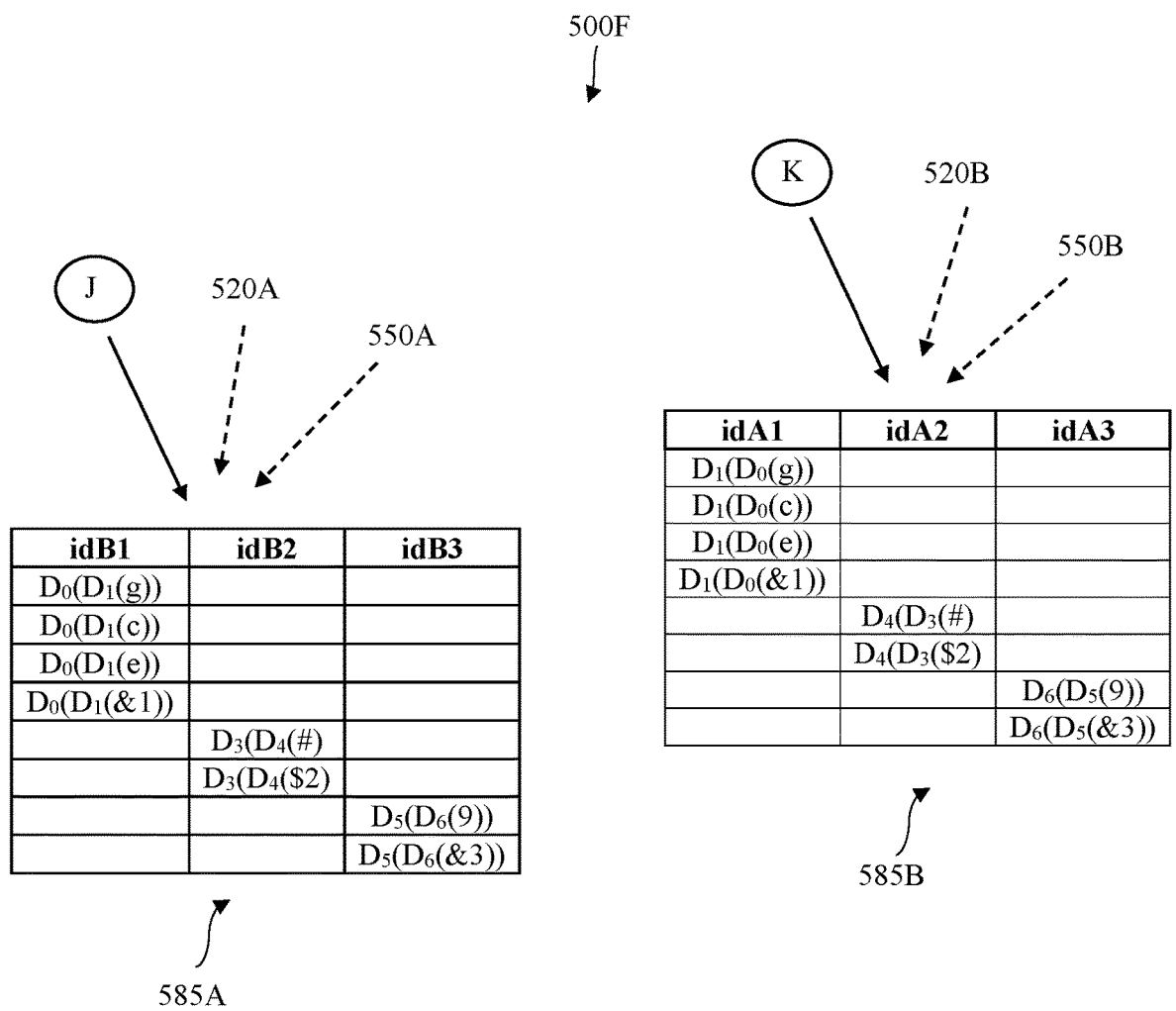

At block 450 (Transform, shuffle, and exchange), the processor of the respective device may transform the ID field (column, idB3) of the dataset 555A using a transforming scheme for Party A (to obtain or generate the dataset 560A of FIG. 5E). In an example embodiment, the processor may encrypt (or decrypt, encode, decode, manipulate, compress, decompress, convert, etc.) the ID field idB3 of the dataset 555A (to obtain or generate the dataset 560A) using e.g., yet another key of Party A based on an ECDH algorithm or protocol (represented by the function $D_5(.)$).

The processor may also transform the ID field (idA3) of the dataset 555B using a transforming scheme for Party B (to obtain or generate the dataset 560B of FIG. 5E). In an example embodiment, the processor may encrypt (or decrypt, encode, decode, manipulate, compress, decompress, convert, etc.) the ID field idA3 of the dataset 555B (to obtain or generate the dataset 560B) using e.g., yet another key of Party B based on the ECDH algorithm or protocol (represented by the function $D_6(.)$).

The processor of the respective device may shuffle (e.g., randomly permute, etc.) the dataset 560A for Party A, and/or shuffle the dataset 560B for Party B.

It is to be understood that at block 450, for Party A and/or Party B, a sequence of the transforming of the dataset and the shuffling of the dataset may be switched or changed, without impacting the purpose of the resultant dataset. For example, the processor may shuffle the dataset 560A, and then transform the shuffled dataset 560A for Party A. The processor may also shuffle the dataset 560B, and then transform the shuffled dataset 560B for Party B.

The processor of the respective device may exchange the dataset 560A (after being shuffled) with the dataset 560B (after being shuffled) between Party A and Party B. For Party A, the processor may dispatch or send the dataset 560A (after being shuffled) to Party B, and receive or obtain the dataset 560B (after being shuffled) from Party B as dataset 565A (see FIG. 5E). For Party B, the processor may dispatch or send the dataset 560B (after being shuffled) to Party A, and receive or obtain the dataset 560A (after being shuffled) from Party A as dataset 565B (see FIG. 5E). It is to be understood that since the dataset 560A and the dataset 560B have been transformed (e.g., encoded, etc.), the corresponding receiving party may not know the real data in the received dataset. Processing may proceed from block 450 to block 455.

At block 455 (Transform and exchange), the processor of the respective device may transform the dataset 565A using a transforming scheme for Party A (to obtain or generate the dataset 570A of FIG. 5E). In an example embodiment, the processor may decrypt (or encrypt, encode, decode, manipulate, compress, decompress, convert, etc.) the dataset 565A using e.g., a key of Party A based on an ECDH algorithm or protocol (represented by the function $D_0(.)$), and then encrypt (or decrypt, encode, decode, manipulate, compress, decompress, convert, etc.) the dataset 565A (to obtain or generate the dataset 570A) using e.g., the yet other key of Party A based on an ECDH algorithm or protocol (represented by the function $D_5(.)$). That is, the dataset 565A is de-transformed (e.g., to remove the key $D_0(.)$) and then transformed again (to add the key $D_5(.)$) to obtain or generate the dataset 570A.

The processor may also transform the dataset 565B using a transforming scheme for Party B (to obtain or generate the dataset 570B of FIG. 5E). In an example embodiment, the processor may decrypt (or encrypt, encode, decode, manipulate, compress, decompress, convert, etc.) the dataset 565B using e.g., a key of Party B based on the ECDH algorithm or protocol (represented by the function $D_1(.)$), and then encrypt (or decrypt, encode, decode, manipulate, compress, decompress, convert, etc.) the dataset 565B (to obtain or generate the dataset 570B) using e.g., the yet other key of Party B based on the ECDH algorithm or protocol (represented by the function $D_6(.)$). That is, the dataset 565B is de-transformed (e.g., to remove the key $D_1(.)$) and then transformed again (to add the key $D_6(.)$) to obtain or generate the dataset 570B. It is to be understood that the results of the functions $D_5(D_6(p))$ and $D_6(D_5(p))$ may be the same for a same parameter "p".

The processor of the respective device may exchange the dataset 570A with the dataset 570B between Party A and Party B. For Party A, the processor may dispatch or send the dataset 570A to Party B, and receive or obtain the dataset 570B from Party B as dataset 575A (see FIG. 5E). For Party B, the processor may dispatch or send the dataset 570B to Party A, and receive or obtain the dataset 570A from Party A as dataset 575B (see FIG. 5E). Processing may proceed from block 455 to block 460.

At block 460 (Match and combine), the processor of the respective device may perform search for a match (or an inner join operation, etc.) between the dataset 570A and the dataset 575A to obtain or generate an intersection (dataset 580A of FIG. 5E) for Party A. It is to be understood that the above operation includes for each identification in the dataset 575A that matches the identification in the dataset 570A, adding or appending the record (or row) of the dataset 575A that contains the matched identification to the dataset 580A. It is also to be understood that for dataset 580A, the ID fields idB1 and idB2 may be optional since the matching is based on idB3 (after idB1 and idB2 being mismatched).

The processor may also perform search for a match (or an inner join operation, etc.) between the dataset 570B and the dataset 575B to obtain or generate an intersection (dataset 580B of FIG. 5E) for Party B. It is to be understood that the above operation includes for each identification in the dataset 575B that matches the identification in the dataset 570B, adding or appending the record (or row) of the dataset 575B that contains the matched identification to the dataset 580B. It is also to be understood that for dataset 580B, the ID fields idA1 and idA2 may be optional since the matching is based on idA3 (after idA1 and idA2 being mismatched).

It is to be understood that for Party A, data in the intersection 580A are also transformed (e.g., encoded, etc.) by Party B (e.g., via $D_6(.)$), and thus Party A may not know the real data in the intersection 580A. For Party B, data in the intersection 580B are also transformed (e.g., encoded, etc.) by Party A (e.g., via $D_5(.)$), and thus Party B may not know the real data in the intersection 580B. That is, the matching or inner join operation conducted, as described above, is a "private" matching or inner join operation. The processor performs a private identity matching without revealing the intersection of datasets of the two parties.

The processor of the respective device may combine the records/rows of the datasets 520A, 550A, and 580 for Party A to obtain or generate the dataset 585A. It is to be understood that in the dataset 585A, the blank values for idB3 indicate that such values are not important (since the higher priority ID field idB1 or idB2 has matched), the blank values for idB2 indicate that such values are not important (since either the higher priority ID field idB1 has matched, or although the ID fields idB1 and idB2 failed to match but the ID field idB3 has matched, indicating that the matched record(s) is/are for a same user/member), and the blank values for idB1 indicate that such values are not important (since although the ID field idB1 failed to match but the ID field idB2 has matched or the ID field idB2 failed to match but the ID field idB3 has matched, indicating that the matched record(s) is/are for a same user/member).

The processor of the respective device may also combine the records/rows of the datasets 520B, 550B, and 580B for Party B to obtain or generate the dataset 585B. It is to be understood that in the dataset 585B, the blank values for idA3 indicate that such values are not important (since the higher priority ID field idA1 or idA2 has matched), the blank values for idA2 indicate that such values are not important (since either the higher priority ID field idA1 has matched, or although the ID fields idA1 and idA2 failed to match but the ID field idA3 has matched, indicating that the matched record(s) is/are for a same user/member), and the blank values for idA1 indicate that such values are not important (since although the ID field idA1 failed to match but the ID field idA2 has matched or the ID field idA2 failed to match but the ID field idA3 has matched, indicating that the matched record(s) is/are for a same user/member). Processing may proceed from block 460 to block 465.

At block 466 (Post-process dataset), the processor of the respective device may process the dataset 585A for Party A and/or the dataset 585B for Party B for further applications. It is to be understood that a size of the intersection (i.e., the dataset 585A of Party A or the dataset 585B of Party B) of the up-sampled datasets (508A and 508B) does not reveal the real intersection size of the original datasets (e.g., 502A for Party A and 502B for Party B) due to the introducing of the padding or filling datasets (504A/506A and/or 504B/506B) and/or the random numbers/elements for up-sampling the original datasets (502A and 502B).

In the intersection 585A or 585B, each ID field has a size greater than (or not equal to) a size of the corresponding ID field in the intersection of the original datasets (502A and 502B). For example, a size of the IdA1 or idB1 field in the intersection of the original datasets (502A and 502B) is 3 (three records, rows, elements, etc., including "g", "c", and "e"), while a size of the IdA1 or idB1 field in the dataset/intersection 585A or 585B is 4 (i.e., the size of the IdA1 or idB1 field in the intersection of datasets 502A and 502B, plus a random element "&1" due to the introducing of the dataset 504A and/or 504B for up-sampling). A size of the IdA2 or idB2 field in the intersection of the original datasets (502A and 502B) is 1 (one record, row, element, etc., including "#"), while a size of the IdA2 or idB2 field in the dataset/intersection 585A or 585B is 2 (i.e., the size of the IdA2 or idB2 field in the intersection of datasets 502A and 502B, plus a random element "$2" due to the introducing of the dataset 504A and/or 504B for up-sampling). A size of the IdA3 or idB3 field in the intersection of the original datasets (502A and 502B) is 1 (one record, row, element, etc., including "9"), while a size of the IdA3 or idB3 field in the dataset/intersection 585A or 585B is 2 (i.e., the size of the IdA3 or idB3 field in the intersection of datasets 502A and 502B, plus a random element "&3" due to the introducing of the dataset 504A and/or 504B for up-sampling).

That is, features in the embodiments disclosed herein may lead to the intersection size revealed in the subsequent multi-identification PSI and/or MPC operations being random and differentially private, making it almost impossible for an attacker to determine a user's membership.

In an example embodiment, one or more of the datasets or intersections 585A and 585B may include one or more features or attributes (i.e., columns that are not identifications). The processor of the respective device may generate secret shares, gather secret shares, and/or generate the results by combining gathered secret shares, etc., based on the IDs and/or the features or attributes of the datasets 585A and/or 585B, for Party A, Party B, or both.

FIG. 6 is a schematic structural diagram of an example computer system 600 applicable to implementing an electronic device (for example, the server or one of the terminal devices shown in FIG. 1), arranged in accordance with at least some embodiments described herein. It is to be understood that the computer system shown in FIG. 6 is provided for illustration only instead of limiting the functions and applications of the embodiments described herein.

As depicted, the computer system 600 may include a central processing unit (CPU) 605. The CPU 605 may perform various operations and processing based on programs stored in a read-only memory (ROM) 610 or programs loaded from a storage device 640 to a random-access memory (RAM) 615. The RAM 615 may also store various data and programs required for operations of the system 600. The CPU 605, the ROM 610, and the RAM 615 may be connected to each other via a bus 620. An input/output (I/O) interface 625 may also be connected to the bus 620.

The components connected to the I/O interface 625 may further include an input device 630 including a keyboard, a mouse, a digital pen, a drawing pad, or the like; an output device 635 including a display such as a liquid crystal display (LCD), a speaker, or the like; a storage device 640 including a hard disk or the like; and a communication device 645 including a network interface card such as a LAN card, a modem, or the like. The communication device 645 may perform communication processing via a network such as the Internet, a WAN, a LAN, a LIN, a cloud, etc. In an embodiment, a driver 650 may also be connected to the I/O interface 625. A removable medium 655 such as a magnetic disk, an optical disk, a magneto-optical disk, a semiconductor memory, or the like may be mounted on the driver 650 as desired, such that a computer program read from the removable medium 655 may be installed in the storage device 640.

It is to be understood that the processes described with reference to the flowcharts of FIGS. 2, 4A, and 4B and/or the processes described in other figures may be implemented as computer software programs or in hardware. The computer program product may include a computer program stored in a computer readable non-volatile medium. The computer program includes program codes for performing the method shown in the flowcharts and/or GUIs. In this embodiment, the computer program may be downloaded and installed from the network via the communication device 645, and/or may be installed from the removable medium 655. The computer program, when being executed by the central processing unit (CPU) 605, can implement the above functions specified in the method in the embodiments disclosed herein.

It is to be understood that the disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., a field programmable gate array, an application specific integrated circuit, or the like.

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory, electrically erasable programmable read-only memory, and flash memory devices; magnetic disks, e.g., internal hard disks or removable disks; magneto optical disks; and compact disc read-only memory and digital video disc read-only memory disks. The processor and the memory can be supplemented by, or incorporated in, special purpose logic circuitry.

It is to be understood that different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by both this disclosure. It is indeed intended that the scope of this disclosure should be determined by a proper legal interpretation and construction of the disclosure, including equivalents, as understood by those of skill in the art relying upon the complete disclosure present at the time of filing.

Aspects:

It is appreciated that any one of aspects can be combined with each other.

Aspect 1. A method for protecting membership in secure multi-party computation and communication, the method comprising: providing a first dataset having a first identification field and a second identification field; generating a padding dataset, a size of the padding dataset being determined based on a data privacy configuration; up-sampling the first dataset with the padding dataset; transforming the first dataset; dispatching the first dataset; receiving a second dataset having a third identification field and a fourth identification field; and performing an intersection operation based on the first dataset and the second dataset to generate a third dataset by: for each identification in the first identification field that matches an identification in the third identification field, removing a row having the matched identification from the second dataset and adding the removed row to the third dataset, and for each identification in the second identification field that matches an identification in the fourth identification field, removing a row having the matched identification from the second dataset and adding the removed row to the third dataset.

Aspect 2. The method of aspect 1, wherein the padding dataset includes a fifth identification field and a sixth identification field, the up-sampling of the first dataset with the padding dataset includes: up-sampling the first identification field with elements in the fifth identification field; and inserting a first set of random elements to the second identification field.

Aspect 3. The method of aspect 2, wherein the up-sampling of the first dataset with the padding dataset further includes: up-sampling the second identification field with elements in the sixth identification field; and inserting a second set of random elements to the first identification field.

Aspect 4. The method of any one of aspects 1-3, further comprising: shuffling the padding dataset before up-sampling the first dataset with the padding dataset.

Aspect 5. The method of any one of aspects 1-4, wherein an intersection of the padding dataset and the first dataset is empty.

Aspect 6. The method of any one of aspects 1-5, wherein the first identification field has a higher priority than the second first identification field, and the third identification field has a higher priority than the fourth first identification field.

Aspect 7. The method of any one of aspects 1-6, wherein the data privacy configuration includes a first parameter and a second parameter, wherein the size of the padding dataset is determined such that the intersection operation is differentially private based on the first parameter and the second parameter.

Aspect 8. The method of aspect 7, wherein the size of the padding dataset is determined based on a number of identification fields of the first dataset.

Aspect 9. The method of aspect 8, wherein the size of the padding dataset is determined further based on a number of intersection operations.

Aspect 10. The method of any one of aspects 1-9, wherein the first dataset includes a seventh identification field, the second dataset includes an eighth identification field, wherein the performing of the intersection operation based on the first dataset and the second dataset to generate the third dataset further includes: for each identification in the seventh identification field that matches an identification in the eighth identification field, removing a row having the matched identification from the second dataset and adding the removed row to the third dataset.

Aspect 11. A secure multi-party computation and communication system, the system comprising: a memory to store a first dataset; a processor to: provide the first dataset having a first identification field and a second identification field; generate a padding dataset, a size of the padding dataset being determined based on a data privacy configuration; up-sample the first dataset with the padding dataset; transform the first dataset; dispatch the first dataset; receive a second dataset having a third identification field and a fourth identification field; and perform an intersection operation based on the first dataset and the second dataset to generate a third dataset by: for each identification in the first identification field that matches an identification in the third identification field, remove a row having the matched identification from the second dataset and add the removed row to the third dataset, and for each identification in the second identification field that matches an identification in the fourth identification field, remove a row having the matched identification from the second dataset and add the removed row to the third dataset.

Aspect 12. The system of aspect 11, wherein the padding dataset includes a fifth identification field and a sixth identification field, the processor is to further: up-sample the first identification field with elements in the fifth identification field; and insert a first set of random elements to the second identification field.

Aspect 13. The system of aspect 12, wherein the processor is to further: up-sample the second identification field with elements in the sixth identification field; and insert a second set of random elements to the first identification field.

Aspect 14. The system of any one of aspects 11-13, wherein the processor is to further: shuffle the padding dataset before up-sampling the first dataset with the padding dataset.

Aspect 15. The system of any one of aspects 11-14, wherein the data privacy configuration includes a first parameter and a second parameter, the size of the padding dataset is determined such that the intersection operation is differentially private based on the first parameter and the second parameter.

Aspect 16. A non-transitory computer-readable medium having computer-executable instructions stored thereon that, upon execution, cause one or more processors to perform operations comprising: providing a first dataset having a first identification field and a second identification field; generating a padding dataset, a size of the padding dataset being determined based on a data privacy configuration; up-sampling the first dataset with the padding dataset; transforming the first dataset; dispatching the first dataset; receiving a second dataset having a third identification field and a fourth identification field; and performing an intersection operation based on the first dataset and the second dataset to generate a third dataset by: for each identification in the first identification field that matches an identification in the third identification field, removing a row having the matched identification from the second dataset and adding the removed row to the third dataset, and for each identification in the second identification field that matches an identification in the fourth identification field, removing a row having the matched identification from the second dataset and adding the removed row to the third dataset.

Aspect 17. The computer-readable medium of aspect 16, wherein the padding dataset includes a fifth identification field and a sixth identification field, the up-sampling of the first dataset with the padding dataset includes: up-sampling the first identification field with elements in the fifth identification field; and inserting a first set of random elements to the second identification field.

Aspect 18. The computer-readable medium of aspect 17, wherein the up-sampling of the first dataset with the padding dataset further includes: up-sampling the second identification field with elements in the sixth identification field; and inserting a second set of random elements to the first identification field.

Aspect 19. The computer-readable medium of any one of aspects 16-18, wherein the operations further comprise: shuffling the padding dataset before up-sampling the first dataset with the padding dataset.

Aspect 20. The computer-readable medium of any one of aspects 16-19, wherein the data privacy configuration includes a first parameter and a second parameter, wherein the size of the padding dataset is determined such that the intersection operation is differentially private based on the first parameter and the second parameter.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A method for protecting membership in a secure system, the method comprising:
   providing a first dataset having a first identification field and a second identification field;
   generating a padding dataset;
   up-sampling the first dataset with the padding dataset;
   receiving a second dataset having a third identification field and a fourth identification field; and
   performing an intersection operation based on the first dataset and the second dataset to generate a third dataset,
   wherein the padding dataset includes a fifth identification field and a sixth identification field, the up-sampling of the first dataset with the padding dataset includes up-sampling the first identification field with elements in the fifth identification field and inserting a first set of random elements to the second identification field,
   the up-sampling of the first dataset with the padding dataset further includes up-sampling the second identification field with elements in the sixth identification field and inserting a second set of random elements to the first identification field, and
   a size of the padding dataset is determined based on a data privacy configuration such that the intersection operation is differentially private based on a first parameter and a second parameter of the data privacy configuration.

2. The method of claim 1, wherein the performing of the intersection operation based on the first dataset and the second dataset to generate the third dataset includes:
   in the first dataset, for each identification in the first identification field that matches an identification in the third identification field, removing a row having the matched identification and adding the removed row to the third dataset.

3. The method of claim 2, wherein the performing of the intersection operation based on the first dataset and the second dataset to generate the third dataset further includes:
   in the first dataset, for each identification in the second identification field that matches an identification in the fourth identification field, removing a row having the matched identification and adding the removed row to the third dataset.

4. The method of claim 1, further comprising:
   shuffling the padding dataset before up-sampling the first dataset with the padding dataset.

5. The method of claim 1, wherein an intersection of the padding dataset and the first dataset is empty.

6. The method of claim 1, wherein the first identification field has a higher priority than the second first identification field, and
   the third identification field has a higher priority than the fourth first identification field.

7. The method of claim 1, further comprising:
   after up-sampling the first dataset with the padding dataset, transforming the first dataset and dispatching the first dataset.

8. The method of claim 1, wherein the size of the padding dataset is determined further based on a number of identification fields of the first dataset.

9. The method of claim 8, wherein the size of the padding dataset is determined further based on a number of intersection operations.

10. The method of claim 1, wherein the first dataset includes a seventh identification field, the second dataset includes an eighth identification field,
    wherein the performing of the intersection operation based on the first dataset and the second dataset to generate the third dataset further includes:
    in the first dataset, for each identification in the seventh identification field that matches an identification in the eighth identification field, removing a row having the matched identification and adding the removed row to the third dataset.

11. A secure system, the system comprising:
    a memory to store a first dataset;
    a processor to:
    provide the first dataset having a first identification field and a second identification field;
    generate a padding dataset;
    up-sample the first dataset with the padding dataset;
    receive a second dataset having a third identification field and a fourth identification field; and perform an intersection operation based on the first dataset and the second dataset to generate a third dataset, wherein the padding dataset includes a fifth identification field and a sixth identification field, the processor is to further up-sample the first identification field with elements in the fifth identification field and insert a first set of random elements to the second identification field, the processor is to further up-sample the second identification field with elements in the sixth identification field and insert a second set of random elements to the first identification field, and a size of the padding dataset is determined based on a data privacy configuration such that the intersection operation is differentially private based on a first parameter and a second parameter of the data privacy configuration.

12. The system of claim 11, wherein the processor is to further:
in the first dataset, for each identification in the first identification field that matches an identification in the third identification field, remove a row having the matched identification and add the removed row to the third dataset.

13. The system of claim 12, wherein the processor is to further:
in the first dataset, for each identification in the second identification field that matches an identification in the fourth identification field, remove a row having the matched identification and add the removed row to the third dataset.

14. The system of claim 11, wherein the processor is to further:
shuffle the padding dataset before up-sampling the first dataset with the padding dataset.

15. The system of claim 11, wherein the processor is to further:
after up-sampling the first dataset with the padding dataset, transform the first dataset and dispatch the first dataset.

16. A non-transitory computer-readable medium having computer-executable instructions stored thereon that, upon execution, cause one or more processors to perform operations comprising:
providing a first dataset having a first identification field and a second identification field;
generating a padding dataset;
up-sampling the first dataset with the padding dataset;
receiving a second dataset having a third identification field and a fourth identification field; and
performing an intersection operation based on the first dataset and the second dataset to generate a third dataset, wherein the padding dataset includes a fifth identification field and a sixth identification field, the up-sampling of the first dataset with the padding dataset includes up-sampling the first identification field with elements in the fifth identification field and inserting a first set of random elements to the second identification field, the up-sampling of the first dataset with the padding dataset further includes up-sampling the second identification field with elements in the sixth identification field and inserting a second set of random elements to the first identification field, and a size of the padding dataset is determined based on a data privacy configuration such that the intersection operation is differentially private based on a first parameter and a second parameter of the data privacy configuration.

17. The computer-readable medium of claim 16, wherein the operations further comprise:
in the first dataset, for each identification in the first identification field that matches an identification in the third identification field, removing a row having the matched identification and adding the removed row to the third dataset.

18. The computer-readable medium of claim 17, wherein the operations further comprise:
in the first dataset, for each identification in the second identification field that matches an identification in the fourth identification field, removing a row having the matched identification and adding the removed row to the third dataset.

19. The computer-readable medium of claim 16, wherein the operations further comprise:
shuffling the padding dataset before up-sampling the first dataset with the padding dataset.

20. The computer-readable medium of claim 16, wherein the operations further comprise:
after up-sampling the first dataset with the padding dataset, transforming the first dataset and dispatching the first dataset.

* * * * *